(12) United States Patent
Koreeda

(10) Patent No.: US 11,951,068 B2
(45) Date of Patent: Apr. 9, 2024

(54) FOUR-LEGGED ANIMAL WHEELCHAIR

(71) Applicant: Hiroaki Koreeda, Shimabara (JP)

(72) Inventor: Hiroaki Koreeda, Shimabara (JP)

( * ) Notice: Subject to any disclaimer, the term of this patent is extended or adjusted under 35 U.S.C. 154(b) by 319 days.

(21) Appl. No.: 17/571,442

(22) Filed: Jan. 7, 2022

(65) Prior Publication Data

US 2022/0125664 A1 Apr. 28, 2022

Related U.S. Application Data

(63) Continuation of application No. PCT/JP2020/029594, filed on Aug. 1, 2020.

(30) Foreign Application Priority Data

Aug. 5, 2019 (JP) .................................. 2019-143476

(51) Int. Cl.
*A61H 3/00* (2006.01)
*A61H 3/04* (2006.01)

(52) U.S. Cl.
CPC ......... *A61H 3/04* (2013.01); *A61H 2003/007* (2013.01); *A61H 2203/03* (2013.01)

(58) Field of Classification Search
CPC .... A61H 3/04; A61H 3/008; A61H 2003/007; A61H 2203/03; A01K 15/02; A01K 15/00
See application file for complete search history.

(56) References Cited

U.S. PATENT DOCUMENTS

| 5,224,444 A * | 7/1993 | Hill ......................... A61H 3/04 119/727 |
| 7,549,398 B2 * | 6/2009 | Robinson ................. A61D 3/00 119/727 |
| 9,179,646 B2 * | 11/2015 | Shalom .................... A61H 3/04 |
| 2004/0231613 A1 * | 11/2004 | Parkes .................. A01K 15/00 119/727 |
| 2019/0209417 A1 * | 7/2019 | Laicheng ................. A61H 3/04 |

FOREIGN PATENT DOCUMENTS

| EP | 3130224 A1 * | 2/2017 |
| JP | 3878609 B2 * | 2/2007 |
| JP | 4244233 B2 * | 3/2009 |
| JP | 5385584 B2 * | 1/2014 ............... A61D 3/00 |
| JP | 2015-70816 A | 4/2015 |
| KR | 20180110525 A * | 10/2018 |

* cited by examiner

*Primary Examiner* — Steve Clemmons
(74) *Attorney, Agent, or Firm* — Muncy, Geissler, Olds & Lowe, P.C.

(57) ABSTRACT

A four-legged animal wheelchair 1A used for a four-legged animal, comprising: a ring frame 2 attached to a body of the four-legged animal near impaired limbs; a plurality of wheel support members 3 that are slidably provided along an outer circumference of the ring frame 2 and rotatably support wheels 4; and wheel displacement mechanisms 5 for displacing, when the four-legged animal changes from an upright state to a side-lying state, a plurality of the wheels 4 to positions in the upright state.

8 Claims, 12 Drawing Sheets

[Figure 1]
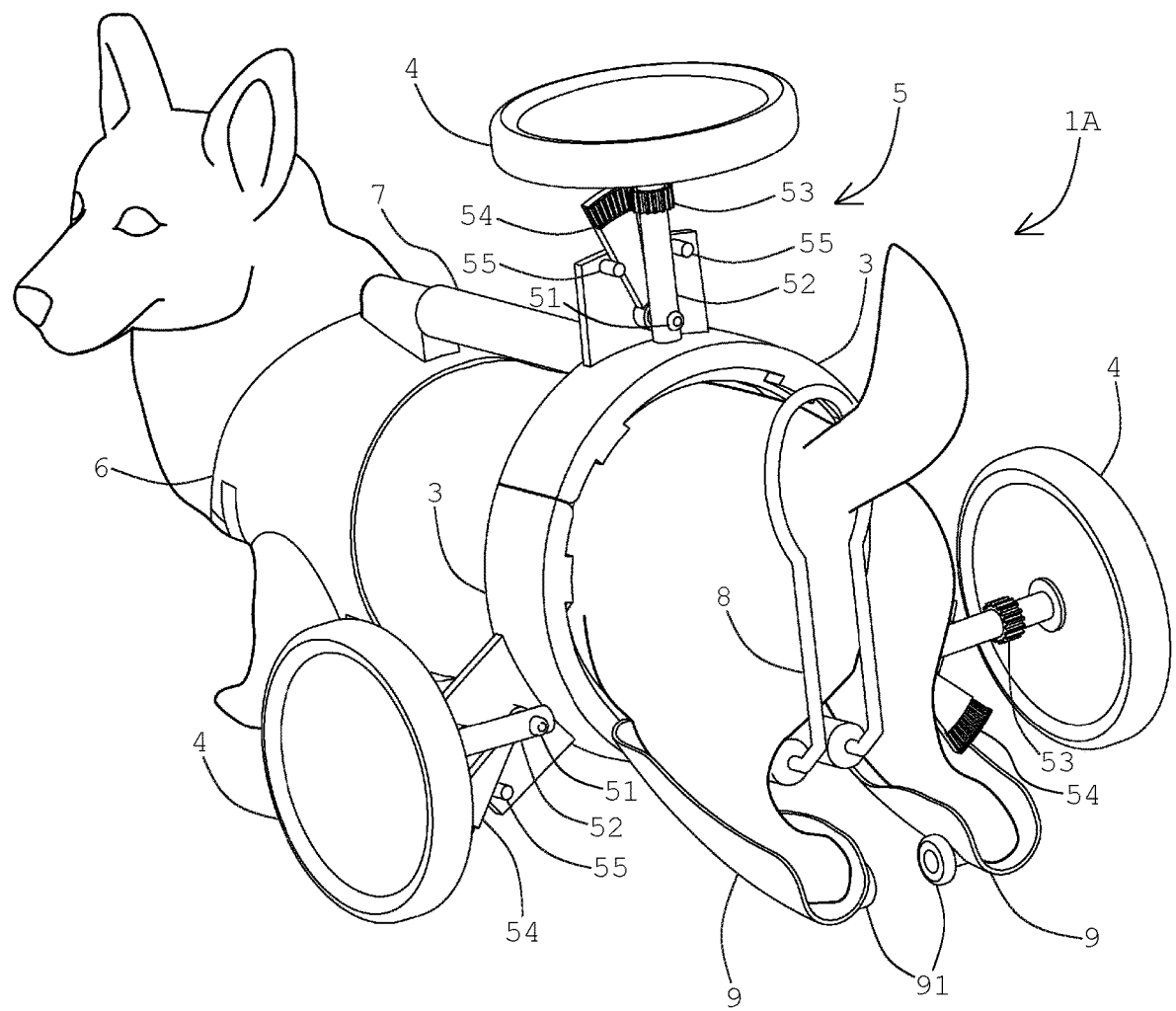

[Figure 2]
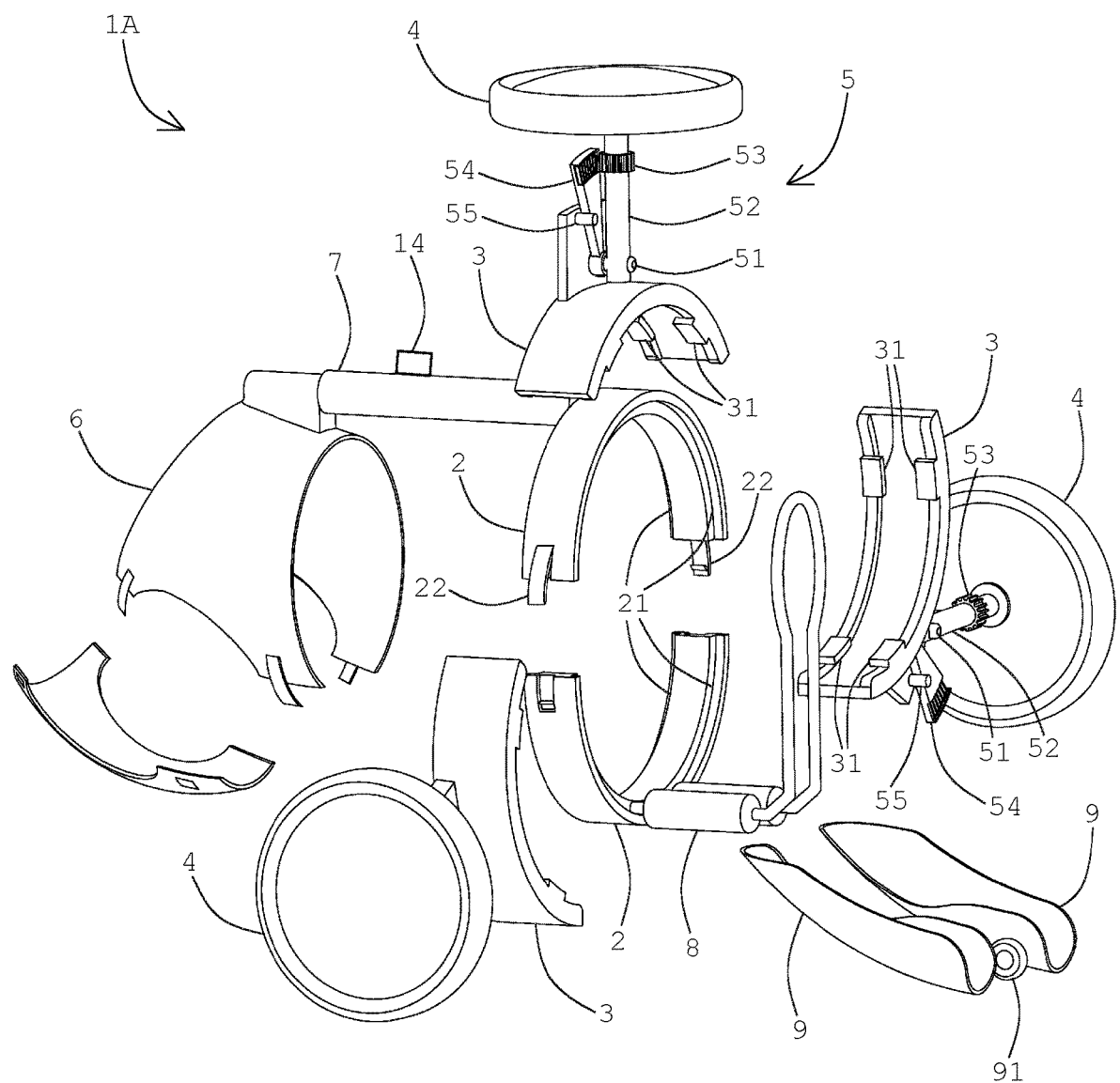

[Figure 3]
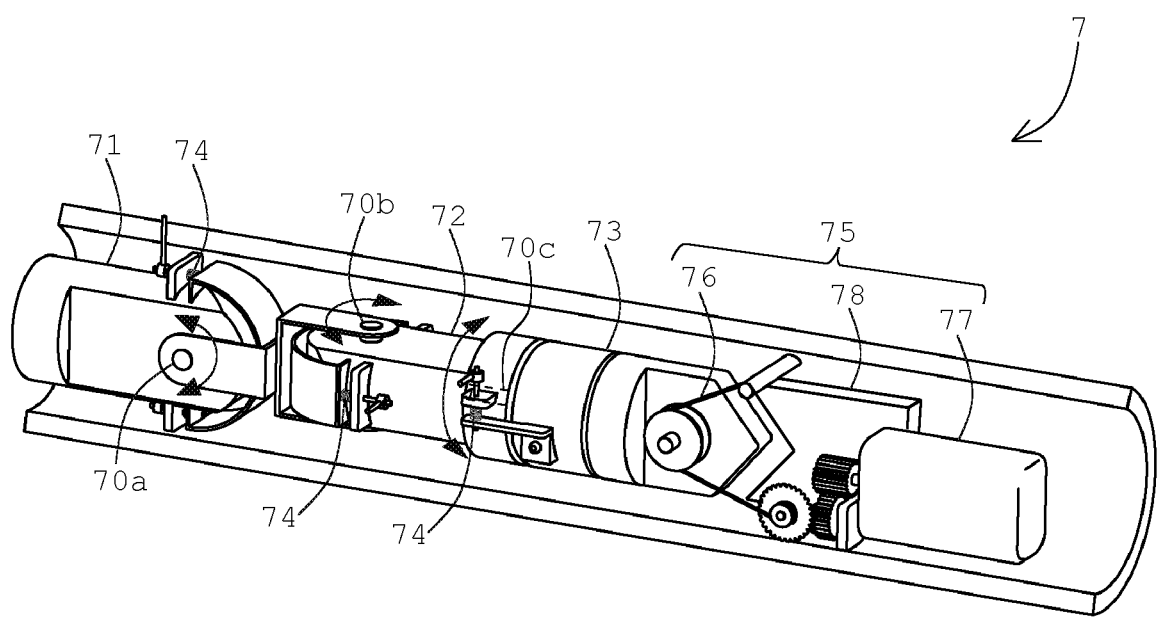

[Figure 4(a)] UPRIGHT STATE
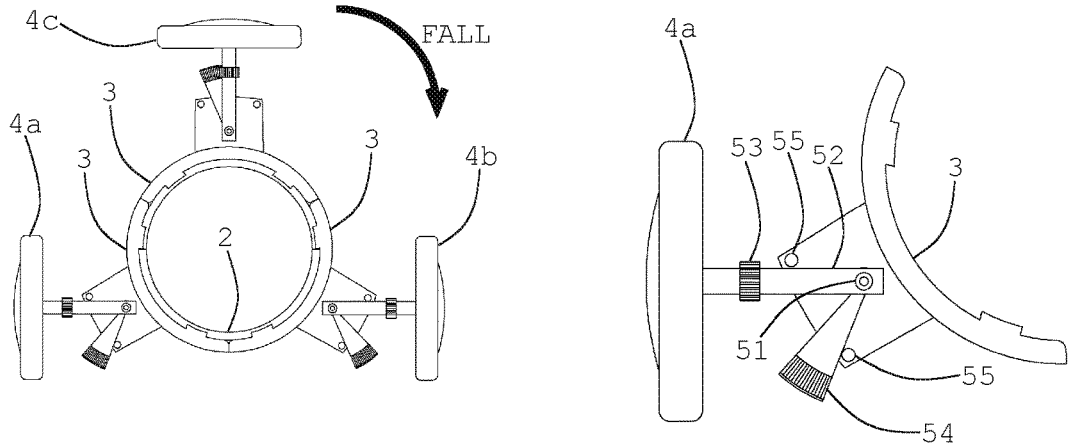
[Figure 4(b)] SIDE-LYING STATE
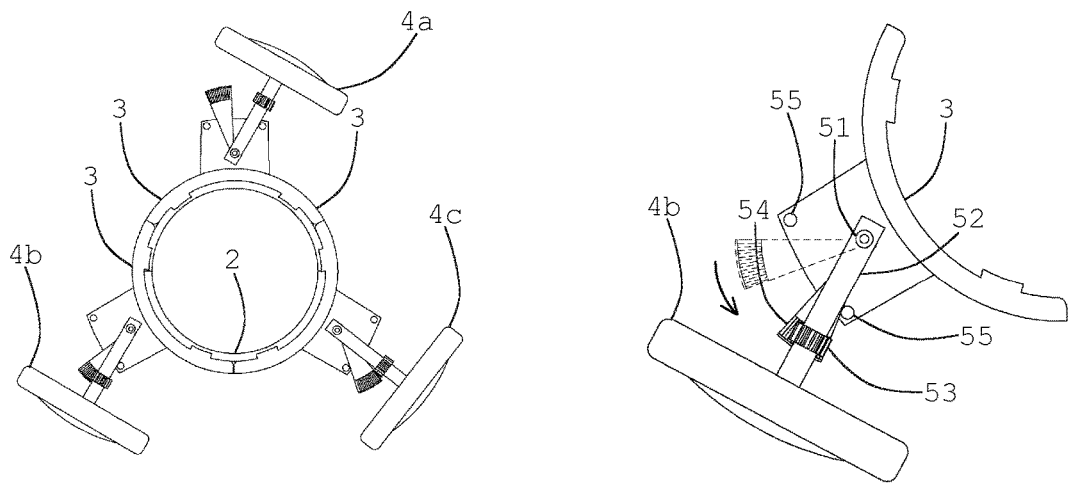
[Figure 4(c)] SIDE-LYING STATE → UPRIGHT STATE
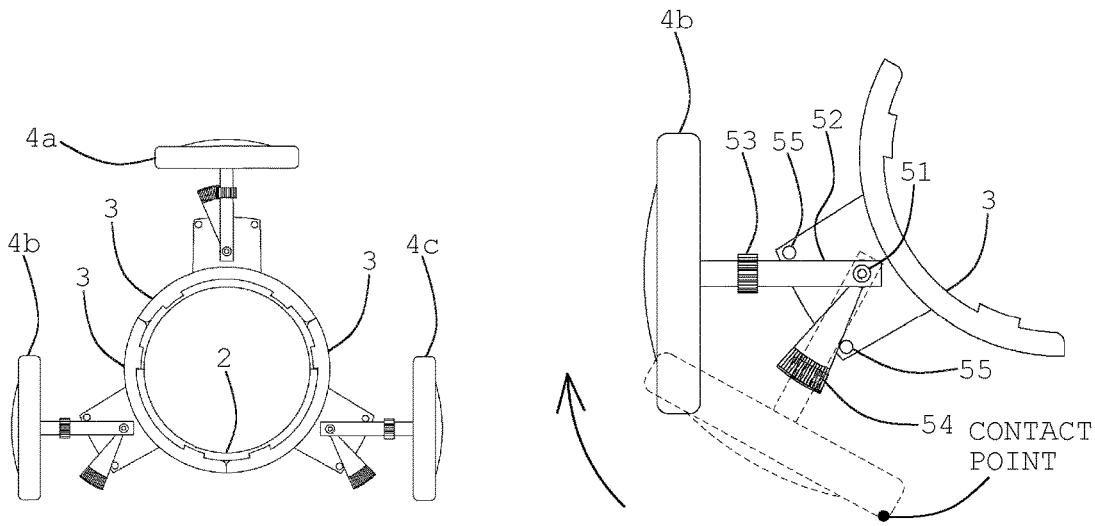

[Figure 5]

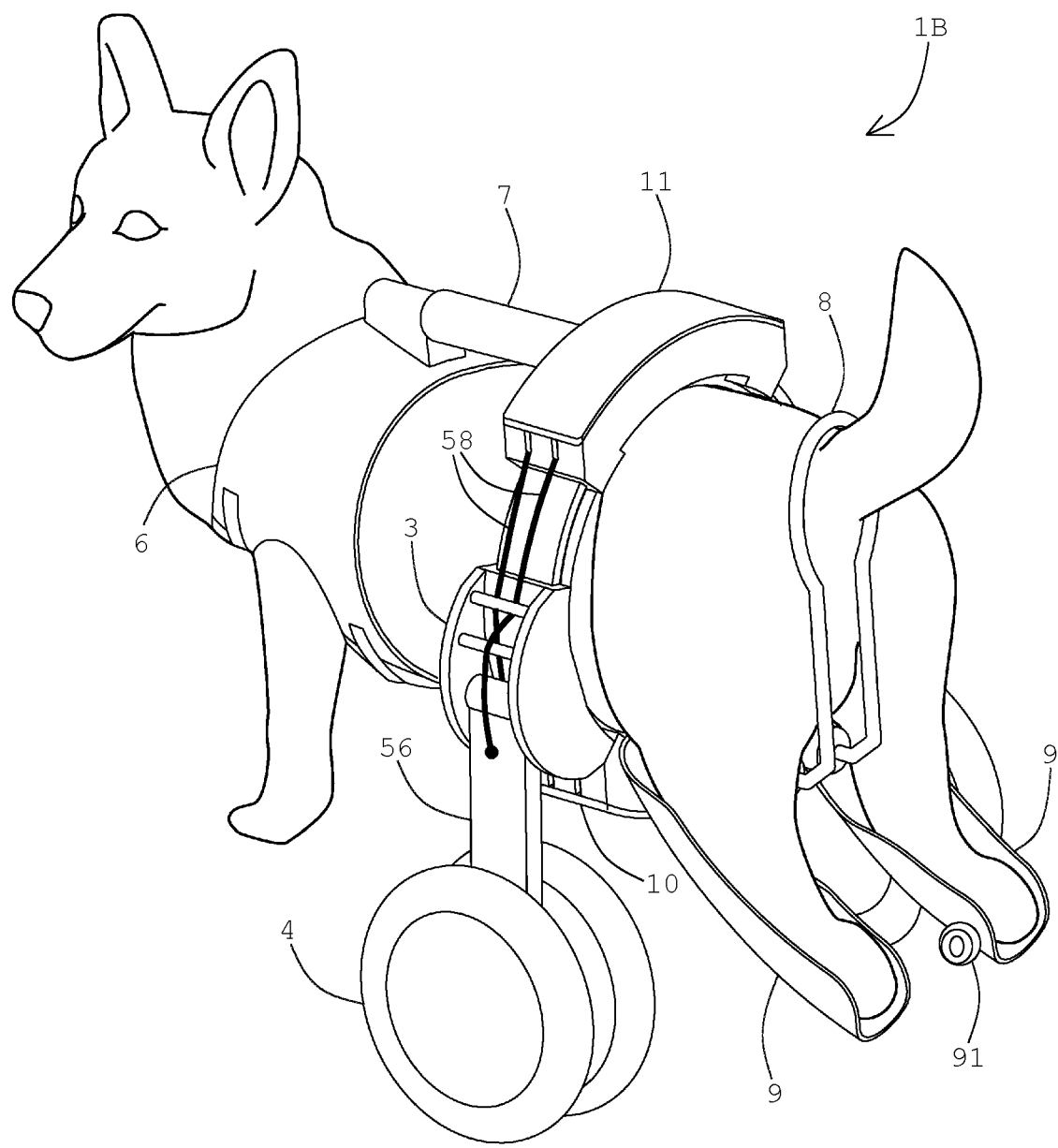# 设计模式

创建型模式

工厂方法 factory method. 定义一个用于创建对象的接口，让子类决定实例化哪一个类。Factory Method 使一个类的实例化延迟到其子类。

适用性

在下列情况下可以使用 Factory Method 模式：

- 当一个类不知道它所必须创建的对象的类的时候。
- 当一个类希望由它的子类来指定它所创建的对象的时候。
- 当类将创建对象的职责委托给多个帮助子类中的某一个，并且你希望将哪一个帮助子类是代理者这一信息局部化的时候。

结构

![factory method pattern](assets/design-pattern-factory-method.png)

参与者

- Product
	- 定义工厂方法所创建的对象的接口。
- ConcreteProduct
	- 实现 Product 接口。
- Creator
	- 声明工厂方法，该方法返回一个 Product 类型的对象。Creator 也可以定义一个工厂方法的缺省实现，它返回一个缺省的 ConcreteProduct 对象。
	- 可以调用工厂方法以创建一个 Product 对象。
- ConcreteCreator
	- 重定义工厂方法以返回一个 ConcreteProduct 实例。

抽象工厂 abstract factory. 提供一个创建一系列相关或相互依赖对象的接口，而无需指定它们具体的类。

适用性

在以下情况可以使用 Abstract Factory 模式：

- 一个系统要独立于它的产品的创建、组合和表示时。
- 一个系统要由多个产品系列中的一个来配置时。
- 当你要强调一系列相关的产品对象的设计以便进行联合使用时。
- 当你提供一个产品类库，而只想显示它们的接口而不是实现时。

结构

![abstract factory pattern](assets/design-pattern-abstract-factory.png)

参与者

- AbstractFactory
	- 声明一个创建抽象产品对象的操作接口。
- ConcreteFactory
	- 实现创建具体产品对象的操作。
- AbstractProduct
	- 为一类产品对象声明一个接口。
- ConcreteProduct
	- 定义一个将被相应的具体工厂创建的产品对象。
	- 实现 AbstractProduct 接口。
- Client
	- 仅使用由 AbstractFactory 和 AbstractProduct 类声明的接口。

建造者 builder. 将一个复杂对象的构建与它的表示分离，使得同样的构建过程可以创建不同的表示。

适用性

在以下情况使用 Builder 模式：

- 当创建复杂对象的算法应该独立于该对象的组成部分以及它们的装配方式时。
- 当构造过程必须允许被构造的对象有不同的表示时。

结构

![builder pattern](assets/design-pattern-builder.png)

参与者

- Builder
	- 为创建一个 Product 对象的各个部件指定抽象接口。
- ConcreteBuilder
	- 实现 Builder 的接口以构造和装配该产品的各个部件。
	- 定义并明确它所创建的表示。
	- 提供一个检索产品的接口。
- Director
	- 构造一个使用 Builder 接口的对象。
- Product
	- 表示被构造的复杂对象。ConcreteBuilder 创建该产品的内部表示并定义它的装配过程。
	- 包含定义组成部件的类，包括将这些部件装配成最终产品的接口。

原型 prototype. 用原型实例指定创建对象的种类，并且通过拷贝这些原型创建新的对象。

适用性

当一个系统应该独立于它的产品创建、构成和表示时，要使用 Prototype 模式；以及

- 当要实例化的类是在运行时刻指定时，例如，通过动态装载；或者
- 为了避免创建一个与产品类层次平行的工厂类层次时；或者
- 当一个类的实例只能有几个不同状态组合中的一种时。建立相应数目的原型并克隆它们可能比每次用合适的状态手工实例化该类更方便一些。

结构

![prototype pattern](assets/design-pattern-prototype.png)

参与者

- Prototype
	- 声明一个克隆自身的接口。
- ConcretePrototype
	- 实现一个克隆自身的操作。
- Client
	- 让一个原型克隆自身从而创建一个新的对象。

单件 singleton. 保证一个类仅有一个实例，并提供一个访问它的全局访问点。

适用性

在下面的情况下可以使用 Singleton 模式

- 当类只能有一个实例而且客户可以从一个众所周知的访问点访问它时。
- 当这个唯一实例应该是通过子类化可扩展的，并且客户应该无需更改代码就能使用一个扩展的实例时。

结构

![singleton pattern](assets/design-pattern-singleton.png)

参与者

- Singleton
	- 定义一个 Instance 操作，允许客户访问它的唯一实例。Instance 是一个类操作。
	- 可能负责创建它自己的唯一实例。

结构型模式

适配器 adapter. 将一个类的接口转换成客户希望的另外一个接口。Adapter 模式使得原本由于接口不兼容而不能一起工作的那些类可以一起工作。

适用性

以下情况使用 Adapter 模式：

- 你想使用一个已经存在的类，而它的接口不符合你的需求。
- 你想创建一个可以复用的类，该类可以与其他不相关的类或不可预见的类（即那些接口可能不一定兼容的类）协同工作。
- （仅适用于对象 Adapter）你想使用一些已经存在的子类，但是不可能对每一个都进行子类化以匹配它们的接口。对象适配器可以适配它的父类接口。

结构

类适配器使用多重继承对一个接口与另一个接口进行匹配。

![class adapter pattern](assets/design-pattern-class-adapter.png)

对象适配器依赖于对象组合。

![object adapter pattern](assets/design-pattern-object-adapter.png)

参与者

- Target
	- 定义 Client 使用的与特定领域相关的接口。
- Client
	- 与符合 Target 接口的对象协同。
- Adaptee
	- 定义一个已经存在的接口，这个接口需要适配。
- Adapter
	- 对 Adaptee 的接口与 Target 接口进行适配。

桥接 bridge. 将抽象部分与它的实现部分分离，使它们都可以独立地变化。

适用性

以下一些情况使用 Bridge 模式：

- 你不希望在抽象和它的实现部分之间有一个固定的绑定关系。例如这种情况可能是因为，在程序运行时刻实现部分应可以被选择或者切换。
- 类的抽象以及它的实现都应该可以通过生成子类的方法加以扩充。这时 Bridge 模式使你可以对不同的抽象接口和实现部分进行组合，并分别对它们进行扩充。
- 对一个抽象的实现部分的修改应对客户不产生影响，即客户的代码不必重新编译。
- （C++）你想对客户完全隐藏抽象的实现部分。在 C++ 中，类的表示在类接口中是可见的。
- 有许多类要生成。这样一种类层次结构说明你必须将一个对象分解成两个部分。Rumbaugh 称这种类层次结构为「嵌套的普化」（nested generalizations）。
- 你想在多个对象间共享实现（可能使用引用计数），但同时要求客户并不知道这一点。一个简单的例子便是 Coplien 的 String 类，在这个类中多个对象可以共享同一个字符串表示（StringRep）。

结构

![bridge pattern](assets/design-pattern-bridge.png)

参与者

- Abstraction
	- 定义抽象类的接口。
	- 维护一个指向 Implementor 类型对象的指针。
- RefinedAbstraction
	- 扩充由 Abstraction 定义的接口。
- Implementor
	- 定义实现类的接口，该接口不一定要与 Abstraction 的接口完全一致；事实上这两个接口可以完全不同。一般来讲，Implementor 接口仅提供基本操作，而 Abstraction 则定义了基于这些基本操作的较高层次的操作。
- ConcreteImplementor
	- 实现 Implementor 接口并定义它的具体实现。

组合 composite. 将对象组合成树形结构以表示「部分-整体」的层次结构。Composite 使得用户对单个对象和组合对象的使用具有一致性。

适用性

以下情况使用 Composite 模式：

- 你想表示对象的部分-整体层次结构。
- 你希望用户忽略组合对象与单个对象的不同，用户将统一地使用组合结构中的所有对象。

结构

![composite pattern](assets/design-pattern-composite.png)

一个典型的 Composite 对象结构可能看起来是下面这样的：

![composite object structure](assets/design-pattern-composite-object-structure.png)

参与者

- Component
	- 为组合中的对象声明接口。
	- 在适当的情况下，实现所有类共有接口的缺省行为。
	- 声明一个接口用于访问和管理 Component 的子组件。
	- （可选）在递归结构中定义一个接口，用于访问一个父部件，并在合适的情况下实现它。
- Leaf
	- 在组合中表示叶节点对象，叶节点没有子节点。
	- 在组合中定义图元对象的行为。
- Composite
	- 定义有子部件的那些部件的行为。
	- 存储子部件。
	- 在 Component 接口中实现与子部件有关的操作。
- Client
	- 通过 Component 接口操纵组合部件的对象。

装饰 decorator. 动态地给一个对象添加一些额外的职责。就扩展功能而言，Decorator 模式比生成子类方式更为灵活。

适用性

以下情况使用 Decorator 模式：

- 在不影响其他对象的情况下，以动态、透明的方式给单个对象添加职责。
- 处理那些可以撤销的职责。
- 当不能采用生成子类的方法进行扩充时。一种情况是，可能有大量独立的扩展，为支持每一种组合将产生大量的子类，使得子类数目呈爆炸性增长。另一种情况可能是因为类定义被隐藏，或类定义不能用于生成子类。

结构

![decorator pattern](assets/design-pattern-decorator.png)

参与者

- Component
	- 定义一个对象接口，可以给这些对象动态地添加职责。
- ConcreteComponent
	- 定义一个对象，可以给这个对象添加一些职责。
- Decorator
	- 维持一个指向 Component 对象的指针，并定义一个与 Component 接口一致的接口。
- ConcreteDecorator
	- 向组件添加职责。

外观 facade. 为子系统中的一组接口提供一个一致的界面，Facade 模式定义了一个高层接口，这个接口使得这一子系统更加容易使用。

适用性

在遇到以下情况使用 Facade 模式：

- 当你要为一个复杂子系统提供一个简单接口时。子系统往往因为不断演化而变得越来越复杂。大多数模式使用时都会产生更多更小的类。这使得子系统更具可重用性，也更容易对子系统进行定制，但这也给那些不需要定制子系统的用户带来一些使用上的困难。Facade 可以提供一个简单的缺省视图，这一视图对大多数用户来说已经足够，而那些需要更多的可定制性的用户可以越过 facade 层。
- 客户程序与抽象类的实现部分之间存在着很大的依赖性。引入 facade 将这个子系统与客户以及其他的子系统分离，可以提高子系统的独立性和可移植性。
- 当你需要构建一个层次结构的子系统时，使用 facade 模式定义子系统中每层的入口点。如果子系统之间是相互依赖的，你可以让它们仅通过 facade 进行通讯，从而简化了它们之间的依赖关系。

结构

![facade pattern](assets/design-pattern-facade.png)

参与者

- Facade
	- 知道哪些子系统类负责处理请求。
	- 将客户的请求代理给适当的子系统对象。
- Subsystem classes
	- 实现子系统的功能。
	- 处理由 Facade 对象指派的任务。
	- 没有 facade 的任何相关信息；即没有指向 facade 的指针。

享元 flyweight. 运用共享技术有效地支持大量细粒度的对象。

适用性

一个应用程序使用了大量的对象，造成了很大的存储开销时应考虑使用 Flyweight 模式；只有在以下情况都成立时才使用 Flyweight 模式：

- 应用程序使用了大量的对象。
- 完全由于使用大量的对象，造成了很大的存储开销。
- 对象的大多数状态都可变为外部状态。
- 如果删除对象的外部状态，那么可以用相对较少的共享对象取代很多组对象。
- 应用程序不依赖于对象标识。由于 Flyweight 对象可以被共享，对于概念上明显有别的对象，标识测试将返回真值。

结构

![flyweight pattern](assets/design-pattern-flyweight.png)

下面的对象图说明了如何共享 flyweight：

![flyweight object structure](assets/design-pattern-flyweight-object-structure.png)

参与者

- Flyweight
	- 描述一个接口，通过这个接口 flyweight 可以接受并作用于外部状态。
- ConcreteFlyweight
	- 实现 Flyweight 接口，并为内部状态（如果有的话）增加存储空间。ConcreteFlyweight 对象必须是可共享的。它所存储的状态必须是内部的，即，它必须独立于 ConcreteFlyweight 对象的场景。
- UnsharedConcreteFlyweight
	- 并非所有的 Flyweight 子类都需要被共享。Flyweight 接口使共享成为可能，但它并不强制共享。在 flyweight 对象结构的某些层次，UnsharedConcreteFlyweight 对象通常将 ConcreteFlyweight 对象作为子节点。
- FlyweightFactory
	- 创建并管理 flyweight 对象。
	- 确保合理地共享 flyweight。当用户请求一个 flyweight 时，FlyweightFactory 对象提供一个已创建的实例或者创建一个（如果不存在的话）。
- Client
	- 维持一个对 flyweight 的引用。
	- 计算或存储一个（多个） flyweight 的外部状态。

代理 proxy. 为其他对象提供一种代理以控制对这个对象的访问。

适用性

在需要用比较通用和复杂的对象指针代替简单的指针的时候，使用 Proxy 模式。下面是一些可以使用 Proxy 模式常见情况：

1. 远程代理（Remote Proxy）为一个对象在不同的地址空间提供局部代表。
2. 虚代理（Virtual Proxy）根据需要创建开销很大的对象。
3. 保护代理（Protection Proxy）控制对原始对象的访问。保护代理用于对象应该有不同的访问权限的时候。
4. 智能指引（Smart Reference）取代了简单的指针，它在访问对象时执行一些附加操作。它的典型用途包括：
	- 对指向实际对象的引用计数，这样当该对象没有引用时，可以自动释放它（也称为 SmartPointers）。
	- 当第一次引用一个持久对象时，将它装入内存。
	- 在访问一个实际对象前，检查是否已经锁定了它，以确保其他对象不能改变它。

结构

![proxy pattern](assets/design-pattern-proxy.png)

下面的对象图表示代理模式在运行时刻的一种可能的结构：

![proxy object structure](assets/design-pattern-proxy-object-structure.png)

参与者

- Proxy
	- 保存一个引用使得代理可以访问实体。若 RealSubject 和 Subject 的接口相同，Proxy 会引用 Subject。
	- 提供一个与 Subject 的接口相同的接口，这样代理就可以用来替代实体。
	- 控制对实体的存取，并可能负责创建和删除它。
	- 其他功能依赖于代理的类型：
		- Remote Proxy 负责对请求及其参数进行编码，并向不同地址空间中的实体发送已编码的请求。
		- Virtual Proxy 可以缓存实体的附加信息，以便延迟对它的访问。例如，ImageProxy 缓存实际图像的形象。
		- Protection Proxy 检查调用者是否具有实现一个请求所必需的访问权限。
- Subject
	- 定义 RealSubject 和 Proxy 的共用接口，这样就在任何使用 RealSubject 的地方都可以使用 Proxy。
- RealSubject
	- 定义 Proxy 所代表的实体。

行为模式

职责链 chain of responsibility. 使多个对象都有机会处理请求，从而避免请求的发送者和接收者之间的耦合关系。将这些对象连成一条链，并沿着这条链传递该请求，直到有一个对象处理它为止。

适用性

在以下条件下使用 Responsibility 链：

- 有多个的对象可以处理一个请求，哪个对象处理该请求运行时刻自动确定。
- 你想在不明确指定接收者的情况下，向多个对象中的一个提交一个请求。
- 可处理一个请求的对象集合应被动态指定。

结构

![chain of responsibility pattern](assets/design-pattern-chain-of-responsibility.png)

一个典型的对象结构可能看起来像下面这样：

![chain of responsibility object structure](assets/design-pattern-chain-of-responsibility-object-structure.png)

参与者

- Handler
	- 定义一个处理请求的接口。
	- （可选）实现后继链。
- ConcreteHandler
	- 处理它所负责的请求。
	- 可访问它的后继者。
	- 如果可处理该请求，就处理之；否则将该请求转发给它的后继者。
- Client
	- 向链上的具体处理者（ConcreteHandler）对象提交请求。

命令 command. 将一个请求封装为一个对象，从而使你可用不同的请求对客户进行参数化；对请求排队或记录请求日志，以及支持可撤销的操作。

适用性

当你有如下需求时，可使用 Command 模式：

- 像上面讨论的 MenuItem 对象那样，抽象出待执行的动作以参数化某对象。你可用过程语言中的回调（callback）函数表达这种参数化机制。所谓回调函数是指函数先在某处注册，而它将在稍后某个需要的时候被调用。Command 模式是回调机制的一个面向对象的替代品。
- 在不同的时刻指定、排列和执行请求。一个 Command 对象可以有一个与初始请求无关的生存期。如果一个请求的接收者可用一种与地址空间无关的方式表达，那么就可将负责该请求的命令对象传送给另一个不同的进程并在那儿实现该请求。
- 支持取消操作。Command 的 Execute 操作可在实施操作前将状态存储起来，在取消操作时这个状态用来消除该操作的影响。Command 接口必须添加一个 Unexecute 操作，该操作取消上一次 Execute 调用的效果。执行的命令被存储在一个历史列表中。可通过向后和向前遍历这一列表并分别调用 Unexecute 和 Execute 来实现重数不限的「取消」和「重做」。
- 支持修改日志，这样当系统崩溃时，这些修改可以被重做一遍。在 Command 接口中添加装载操作和存储操作，可以用来保持变动的一个一致的修改日志。从崩溃中恢复的过程包括从磁盘中重新读入记录下来的命令并用 Execute 操作重新执行它们。
- 用构建在原语操作上的高层操作构造一个系统。这样一种结构在支持事务（transaction）的信息系统中很常见。一个事务封装了对数据的一组变动。Command 模式提供了对事务进行建模的方法。Command 有一个公共的接口，使得你可以用同一种方式调用所有的事务。同时使用该模式也易于添加新事务以扩展系统。

结构

![command pattern](assets/design-pattern-command.png)

参与者

- Command
	- 声明执行操作的接口。
- ConcreteCommand
	- 将一个接收者对象绑定于一个动作。
	- 调用接收者相应的操作，以实现 Execute。
- Client
	- 创建一个具体命令对象并设定它的接收者。
- Invoker
	- 要求该命令执行这个请求。
- Receiver
	- 知道如何实施与执行一个请求相关的操作。任何类都可能作为一个接收者。

解释器 interpreter. 给定一个语言，定义它的文法的一种表示，并定义一个解释器，这个解释器使用该表示来解释语言中的句子。

适用性

当有一个语言需要解释执行，并且你可将该语言中的句子表示为一个抽象语法树时，可使用解释器模式。而当存在以下情况时该模式效果最好：

- 该文法简单对于复杂的文法，文法的类层次变得庞大而无法管理。此时语法分析程序生成器这样的工具是更好的选择。它们无需构建抽象语法树即可解释表达式，这样可以节省空间而且还可能节省时间。
- 效率不是一个关键问题最高效的解释器通常不是通过直接解释语法分析树实现的，而是首先将它们转换成另一种形式。例如，正则表达式通常被转换成状态机。但即使在这种情况下，转换器仍可用解释器模式实现，该模式仍是有用的。

结构

![interpreter pattern](assets/design-pattern-interpreter.png)

参与者

- AbstractExpression
	- 声明一个所有具体表达式角色都需要实现的抽象接口。这个接口主要是一个 interpret() 方法，称做解释操作。
- TerminalExpression
	- 具体表达式，实现了抽象表达式角色所要求的接口，主要是一个 interpret() 方法；文法中的每一个终结符都有一个具体终结表达式与之相对应。比如有一个简单的公式 R=R1+R2，在里面 R1 和 R2 就是终结符，对应的解析 R1 和 R2 的解释器就是终结符表达式。
- NonterminalExpression
	- 非终结符表达式，文法中的每一条规则对应于一个非终结符表达式，非终结符表达式一般是文法中的运算符或者其他关键字，比如公式 R=R1+R2 中，+ 就是非终结符，解析 + 的解释器就是一个非终结符表达式。
- Context
	- 环境角色，通常包含各个解释器需要的数据或是公共的功能，一般用来传递被所有解释器共享的数据，后面的解释器可以从这里获取这些值。
- Client
	- 客户角色，指的是使用解释器的客户端，通常在这里将按照语言的语法做的表达式转换成使用解释器对象描述的抽象语法树，然后调用解释操作。

迭代器 iterator. 提供一种方法顺序访问一个聚合对象中各个元素，而又不需暴露该对象的内部表示。

适用性

迭代器模式可用来：

- 访问一个聚合对象的内容而无需暴露它的内部表示。
- 支持对聚合对象的多种遍历。
- 为遍历不同的聚合结构提供一个统一的接口（即，支持多态迭代）。

结构

![iterator pattern](assets/design-pattern-iterator.png)

参与者

- Iterator
	- 迭代器定义访问和遍历元素的接口。
- ConcreteIterator
	- 具体迭代器实现迭代器接口。
	- 对该聚合遍历时跟踪当前位置。
- Aggregate
	- 聚合定义创建相应迭代器对象的接口。
- ConcreteAggregate
	- 具体聚合实现创建相应迭代器的接口，该操作返回 ConcreteIterator 的一个适当的实例。

中介者 mediator. 用一个中介对象来封装一系列的对象交互。中介者使各对象不需要显式地相互引用，从而使其耦合松散，而且可以独立地改变它们之间的交互。

适用性

在下列情况下使用中介者模式：

- 一组对象以定义良好但是复杂的方式进行通信。产生的相互依赖关系结构混乱且难以理解。
- 一个对象引用其他很多对象并且直接与这些对象通信，导致难以复用该对象。
- 想定制一个分布在多个类中的行为，而又不想生成太多的子类。

结构

![mediator pattern](assets/design-pattern-mediator.png)

一个典型的对象结构可能如下图所示：

![mediator object structure](assets/design-pattern-mediator-object-structure.png)

参与者

- Mediator
	- 中介者定义一个接口用于与各同事（Colleague）对象通信。
- ConcreteMediator
	- 具体中介者通过协调各同事对象实现协作行为。
	- 了解并维护它的各个同事。
- Colleague class
	- 每一个同事类都知道它的中介者对象。
	- 每一个同事对象在需与其他的同事通信的时候，与它的中介者通信。

备忘录 memento. 在不破坏封装性的前提下，捕获一个对象的内部状态，并在该对象之外保存这个状态。这样以后就可将该对象恢复到原先保存的状态。

适用性

在以下情况下使用备忘录模式：

- 必须保存一个对象在某一个时刻的（部分）状态，这样以后需要时它才能恢复到先前的状态。
- 如果一个用接口来让其它对象直接得到这些状态，将会暴露对象的实现细节并破坏对象的封装性。

结构

![memento pattern](assets/design-pattern-memento.png)

参与者

- Memento
	- 备忘录存储原发器对象的内部状态。原发器根据需要决定备忘录存储原发器的哪些内部状态。
	- 防止原发器以外的其他对象访问备忘录。备忘录实际上有两个接口，管理者（Caretaker）只能看到备忘录的窄接口——它只能将备忘录传递给其他对象。相反，原发器能够看到一个宽接口，允许它访问返回到先前状态所需的所有数据。理想的情况是只允许生成本备忘录的那个原发器访问本备忘录的内部状态。
- Originator
	- 原发器创建一个备忘录，用以记录当前时刻它的内部状态。
	- 使用备忘录恢复内部状态。
- Caretaker
	- 负责保存好备忘录。
	- 不能对备忘录的内容进行操作或检查。

观察者 observer. 定义对象间的一种一对多的依赖关系，当一个对象的状态发生改变时，所有依赖于它的对象都得到通知并被自动更新。

适用性

在以下任一情况下可以使用观察者模式：

- 当一个抽象模型有两个方面，其中一个方面依赖于另一方面。将这二者封装在独立的对象中以使它们可以各自独立地改变和复用。
- 当对一个对象的改变需要同时改变其它对象，而不知道具体有多少对象有待改变。
- 当一个对象必须通知其它对象，而它又不能假定其它对象是谁。换言之，你不希望这些对象是紧密耦合的。

结构

![observer pattern](assets/design-pattern-observer.png)

参与者

- Subject
	- 目标知道它的观察者。可以有任意多个观察者观察同一个目标。
	- 提供注册和删除观察者对象的接口。
- Observer
	- 为那些在目标发生改变时需获得通知的对象定义一个更新接口。
- ConcreteSubject
	- 将有关状态存入各 ConcreteObserver 对象。
	- 当它的状态发生改变时，向它的各个观察者发出通知。
- ConcreteObserver
	- 维护一个指向 ConcreteSubject 对象的引用。
	- 存储有关状态，这些状态应与目标的状态保持一致。
	- 实现 Observer 的更新接口以使自身状态与目标的状态保持一致。

状态 state. 允许一个对象在其内部状态改变时改变它的行为。对象看起来似乎修改了它的类。

适用性

在下面的两种情况下均可使用 State 模式：

- 一个对象的行为取决于它的状态，并且它必须在运行时刻根据状态改变它的行为。
- 一个操作中含有庞大的多分支的条件语句，且这些分支依赖于该对象的状态。这个状态通常用一个或多个枚举常量表示。通常，有多个操作包含这一相同的条件结构。State 模式将每一个条件分支放入一个独立的类中。这使得你可以根据对象自身的情况将对象的状态作为一个对象，这一对象可以不依赖于其他对象而独立变化。

结构

![state pattern](assets/design-pattern-state.png)

参与者

- Context
	- 定义客户感兴趣的接口。
	- 维护一个 ConcreteState 子类的实例，这个实例定义当前状态。
- State
	- 定义一个接口以封装与 Context 的一个特定状态相关的行为。
- ConcreteState subclass
	- 每一子类实现一个与 Context 的一个状态相关的行为。

策略 strategy. 定义一系列的算法，把它们一个个封装起来，并且使它们可相互替换。本模式使得算法可独立于使用它的客户而变化。

适用性

当存在以下情况时使用 Strategy 模式：

- 许多相关的类仅仅是行为有异。「策略」提供了一种用多个行为中的一个行为来配置一个类的方法。
- 需要使用一个算法的不同变体。例如，你可能会定义一些反映不同的空间/时间权衡的算法。当这些变体实现为一个算法的类层次时，可以使用策略模式。
- 算法使用客户不应该知道的数据。可使用策略模式以避免暴露复杂的、与算法相关的数据结构。
- 一个类定义了多种行为，并且这些行为在这个类的操作中以多个条件语句的形式出现。将相关的条件分支移入它们各自的 Strategy 类中以代替这些条件语句。

结构

![strategy pattern](assets/design-pattern-strategy.png)

参与者

- Strategy
	- 定义所有支持的算法的公共接口。Context 使用这个接口来调用某 ConcreteStrategy 定义的算法。
- ConcreteStrategy
	- 以 Strategy 接口实现某具体算法。
- Context
	- 用一个 ConcreteStrategy 对象来配置。
	- 维护一个对 Strategy 对象的引用。
	- 可定义一个接口来让 Strategy 访问它的数据。

模板方法 template method. 定义一个操作中的算法的骨架，而将一些步骤延迟到子类中。TemplateMethod 使得子类可以不改变一个算法的结构即可重定义该算法的某些特定步骤。

适用性

模板方法应用于下列情况：

- 一次性实现一个算法的不变的部分，并将可变的行为留给子类来实现。
- 各子类中公共的行为应被提取出来并集中到一个公共父类中以避免代码重复。这是 OpitDyck 描述的「重分解以一般化」的一个很好的例子。首先识别现有代码中的不同之处，并且将不同之处分离为新的操作。最后，用一个调用这些新的操作的模板方法来替换这些不同的代码。
- 控制子类扩展。模板方法只在特定点调用「hook」操作（参见效果一节），这样就只允许在这些点进行扩展。

结构

![template method pattern](assets/design-pattern-template-method.png)

参与者

- AbstractClass
	- 定义抽象的原语操作（primitive operation），具体的子类将重定义它们以实现一个算法的各步骤。
	- 实现一个模板方法，定义一个算法的骨架。该模板方法不仅调用原语操作，也调用定义在 AbstractClass 或其他对象中的操作。
- ConcreteClass
	- 实现原语操作以完成算法中与特定子类相关的步骤。

访问者 visitor. 表示一个作用于某对象结构中的各元素的操作。它使你可以在不改变各元素的类的前提下定义作用于这些元素的新操作。

适用性

在下列情况下使用 Visitor 模式：

- 一个对象结构包含很多类对象，它们有不同的接口，而你想对这些对象实施一些依赖于其具体类的操作。
- 需要对一个对象结构中的对象进行很多不同的并且不相关的操作，而你想避免让这些操作「污染」这些对象的类。Visitor 使得你可以将相关的操作集中起来定义在一个类中。当该对象结构被很多应用共享时，用 Visitor 模式让每个应用仅包含需要用到的操作。
- 定义对象结构的类很少改变，但经常需要在此结构上定义新的操作。改变对象结构类需要重定义对所有访问者的接口，这可能需要很大的代价。如果对象结构类经常改变，那么可能还是在这些类中定义这些操作较好。

结构

![visitor pattern](assets/design-pattern-visitor.png)

参与者

- Visitor
	- 为该对象结构中 ConcreteElement 的每一个类声明一个 Visit 操作。该操作的名字和特征标识了发送 Visit 请求给该访问者的那个类。这使得访问者可以确定正被访问元素的具体的类。这样访问者就可以通过该元素的特定接口直接访问它。
- ConcreteVisitor
	- 实现每个由 Visitor 声明的操作。每个操作实现本算法的一部分，而该算法片段乃是对应于结构中对象的类。ConcreteVisitor 为该算法提供了上下文并存储它的局部状态。这一状态常常在遍历该结构的过程中累积结果。
- Element
	- 定义一个 Accept 操作，它以一个访问者为参数。
- ConcreteElement
	- 实现 Accept 操作，该操作以一个访问者为参数。
- ObjectStructure
	- 能枚举它的元素。
	- 可以提供一个高层的接口以允许该访问者访问它的元素。
	- 可以是一个组合（参见 Composite）或是一个集合，如一个列表或一个无序集合。

[Figure 6]
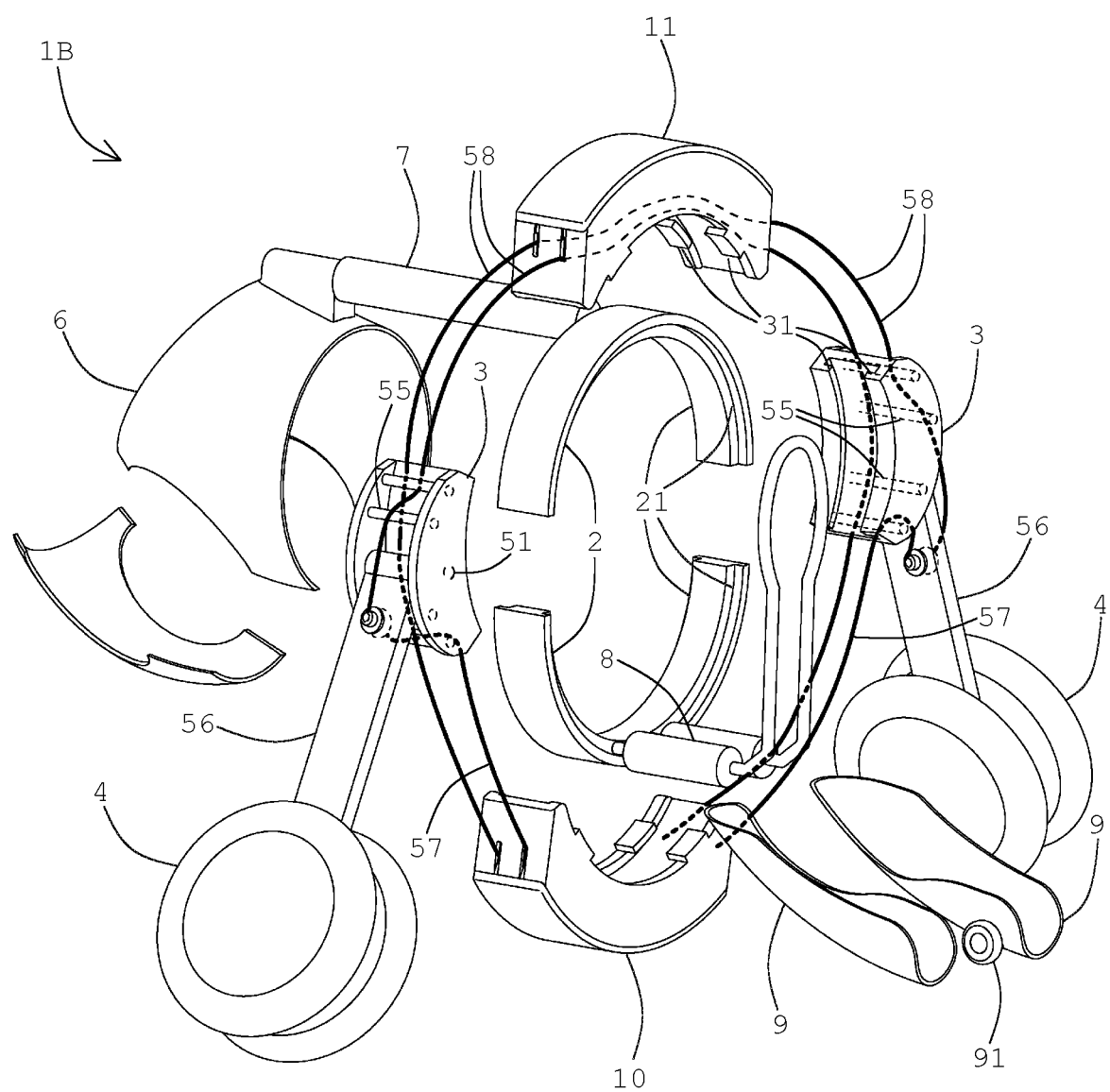

[Figure 7]
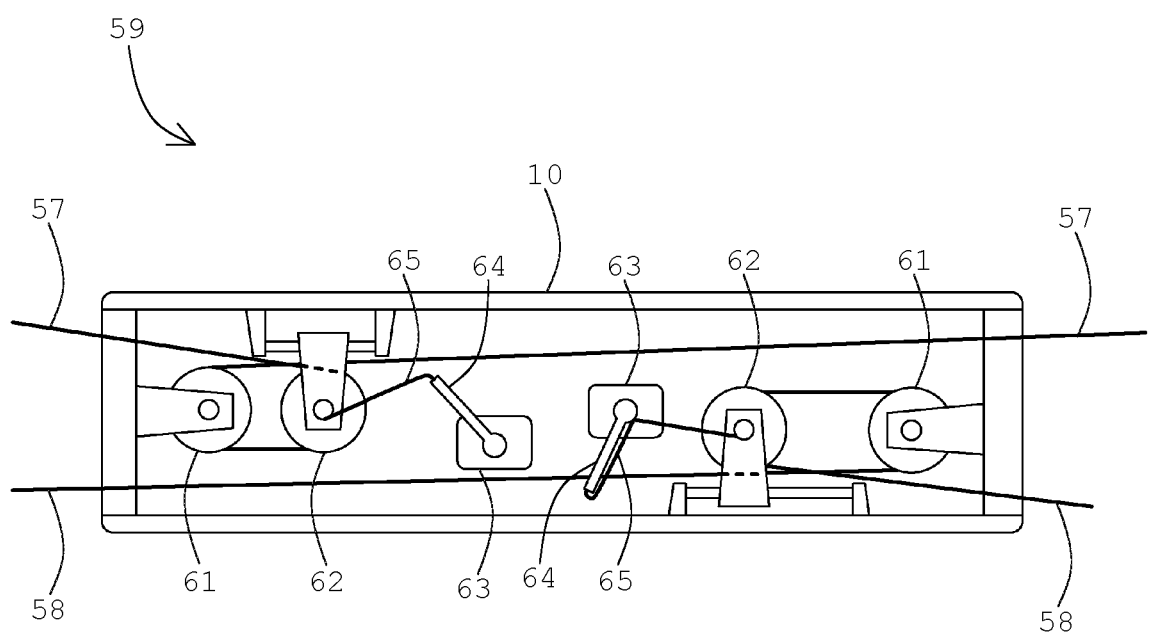

[Figure 8(a)] 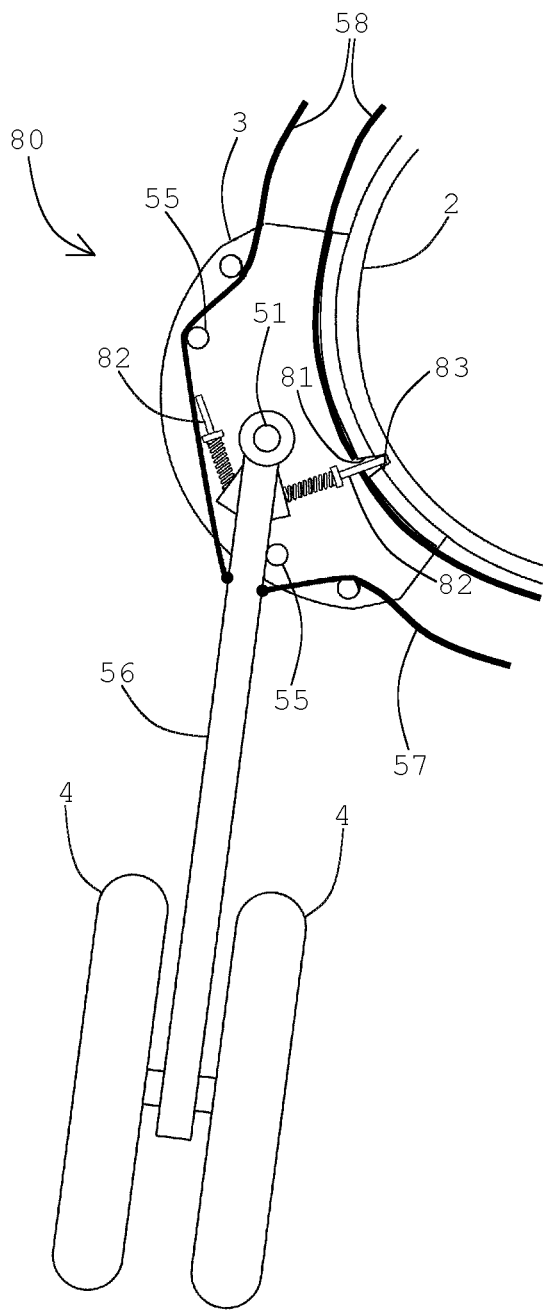
[Figure 8(b)] 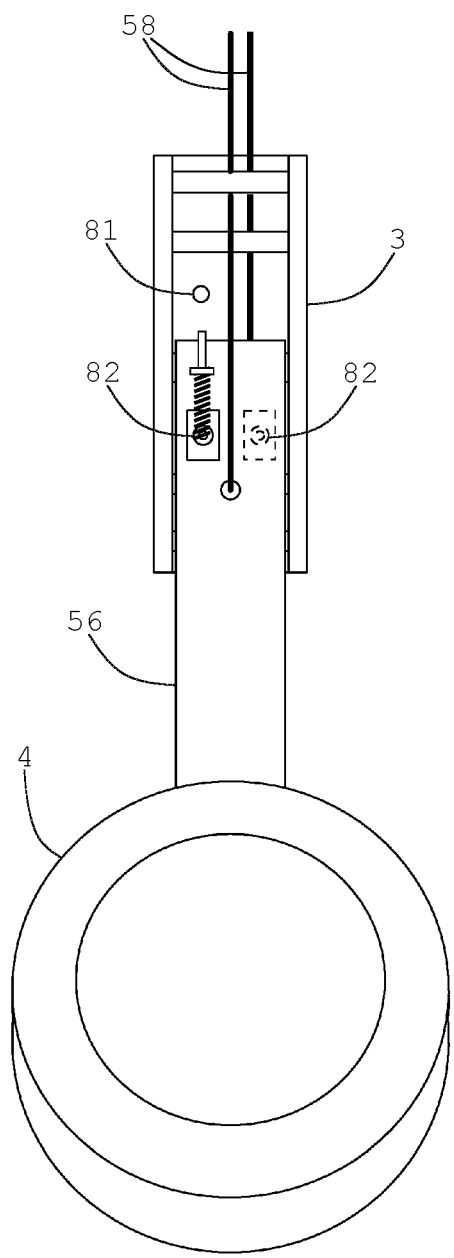

[Figure 9(a)]
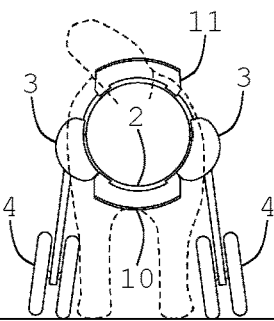
[Figure 9(b)]
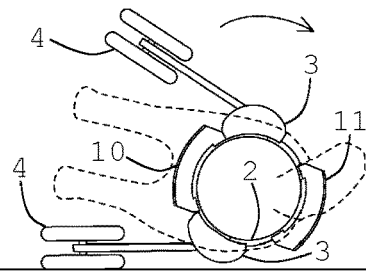
[Figure 9(c)]
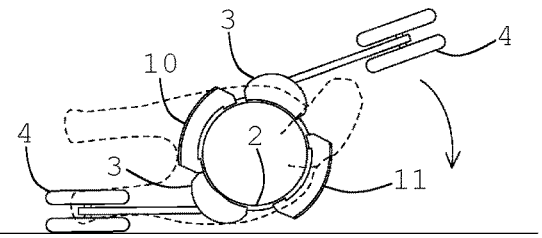
[Figure 9(d)]
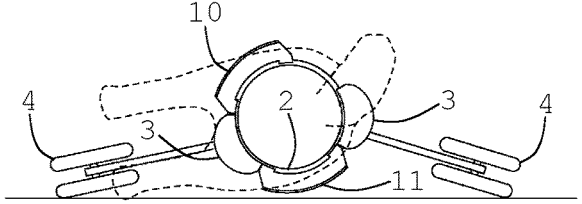
[Figure 9(e)]
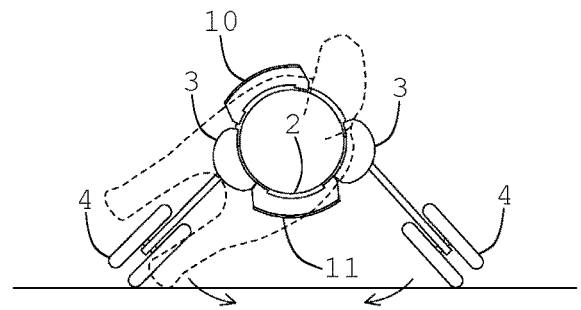
[Figure 9(f)]
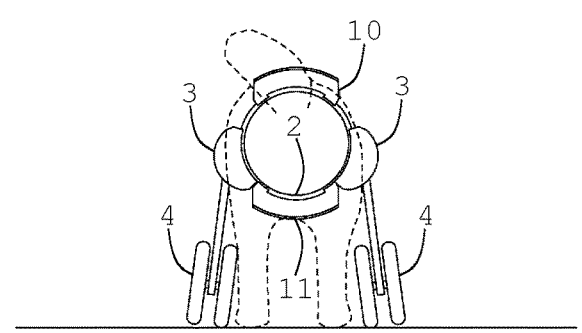

[Figure 10]
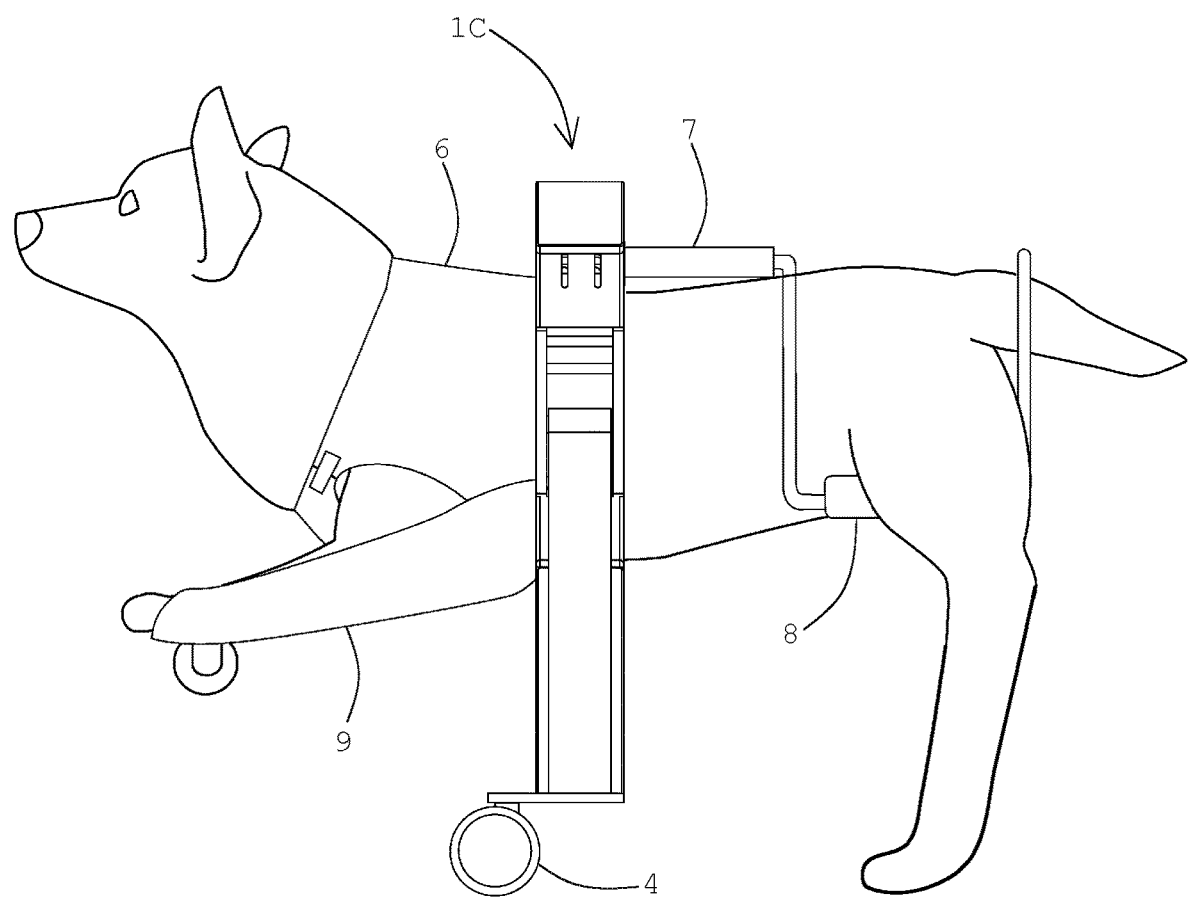

[Figure 11]
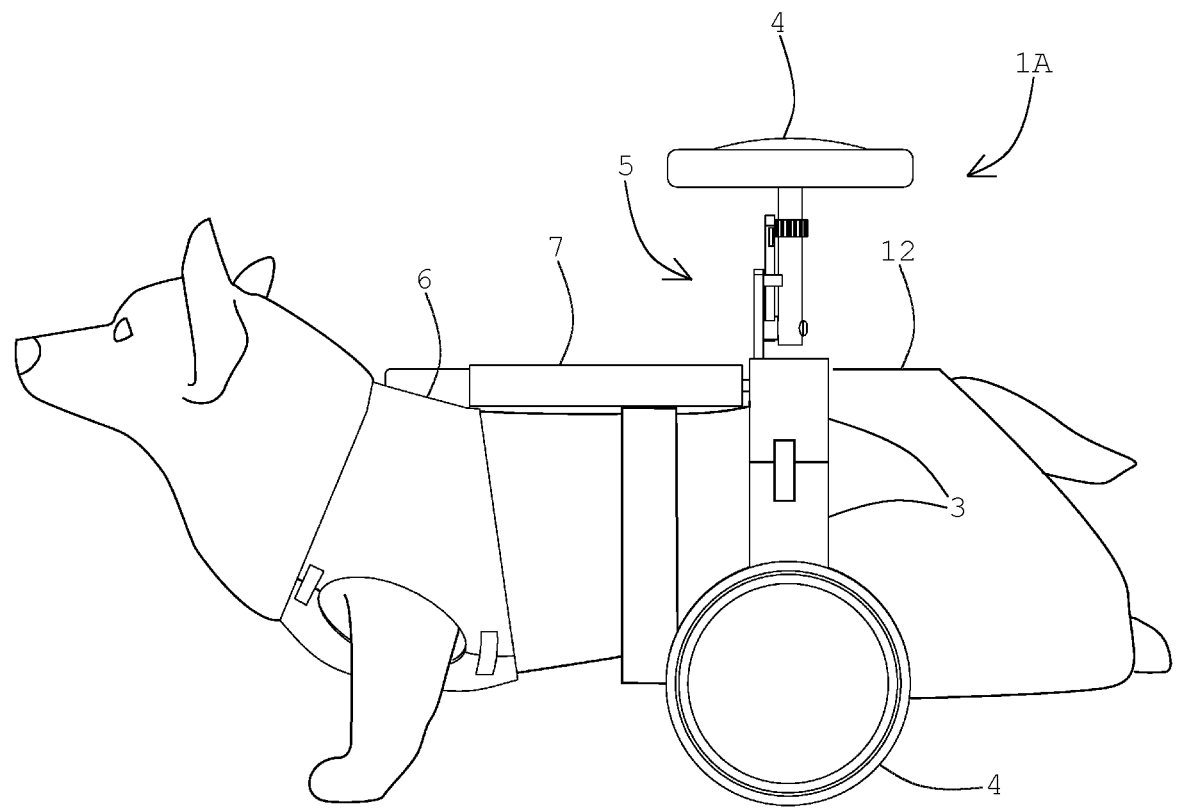

[Figure 12]
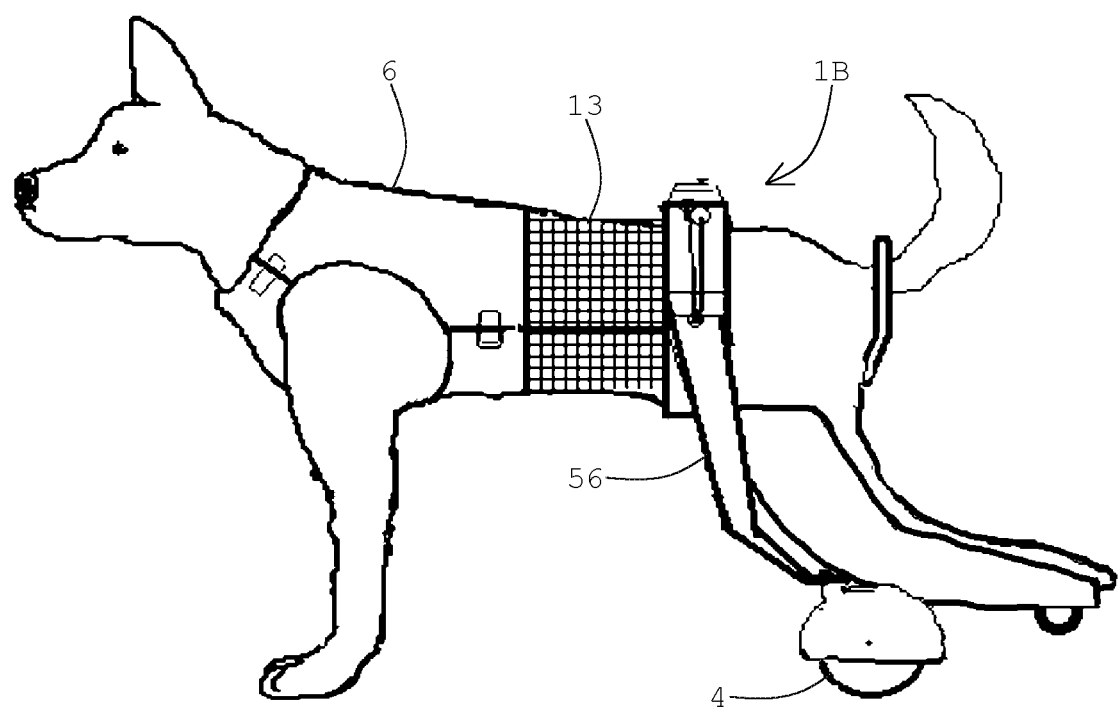

FOUR-LEGGED ANIMAL WHEELCHAIR

TECHNICAL FIELD

The present invention relates to a four-legged animal wheelchair for a four-legged animal (quadruped) that suffers walking difficulty because its forelimb or hindlimb is paralyzed or amputated or the like due to sickness or an accident and has insufficient motor function.

BACKGROUND ART

Many four-legged animals with impaired forelimbs or hindlimbs that have been paralyzed or amputated or the like due to sickness or accidents tend to walk only with normal limbs while dragging impaired limbs, though muscle forces and body figures vary among individuals. Thus, conventionally, wheel chairs for such four-legged animals have been proposed. For example, Japanese Patent Laid-Open No. 2015-70816 discloses a four-legged animal wheelchair that can be more comfortably used by a four-legged animal without interfering with the curving of the body when the four-legged animal turns directions with hindlimbs having an insufficient motor function due to sickness or an accident or the like (Patent Literature 1).

CITATION LIST

Patent Literature

Patent Literature 1: Japanese Patent Application Laid-Open No. 2015-70816

SUMMARY OF INVENTION

Technical Problem

Unfortunately, according to conventional four-legged animal wheelchairs including the four-legged animal wheelchair described in Patent Literature 1, a four-legged animal that falls or the like and is placed into a side-lying state (lying on its side) has difficulty in standing up by itself.

Specifically, a four-legged animal that wears the conventional four-legged animal wheelchair forms a triangle with the tail or the head at the top and a line connecting the left and right wheels at the bottom. Hence, once the four-legged animal that wears the conventional four-legged animal wheelchair changes to a side-lying state, the belly or chest near an impaired limb keeps facing upward, limiting a movement of normal limbs that are supposed to trigger a standing motion. Consequently, the four-legged animal cannot stand up by itself and keeps struggling in a side-lying state, causing scratches on the elbow or knee.

The present invention has been devised to solve the problem. An object of the present invention is to provide a four-legged animal wheelchair that enables a four-legged animal that falls or the like and is placed into a side-lying state to stand up by itself.

Solution to Problem

A four-legged animal wheelchair according to the present invention is a four-legged animal wheel chair used for a four-legged animal in order to solve the problem such that a four-legged animal that falls or the like and is placed in a side-lying state can stand up by itself, the four-legged animal wheelchair including: a ring frame attached to the body of the four-legged animal near impaired limbs; a plurality of wheel support members that are slidably provided along the outer circumference of the ring frame and rotatably support wheels; and wheel displacement mechanisms for displacing, when the four-legged animal changes from an upright state to a side-lying state, a plurality of the wheels to positions in the upright state.

As an aspect of the present invention, in order to solve the problem such that the wheels are displaced only with machine components without using a sensor or a motor or the like, the wheel displacement mechanism may include: a support shaft that is provided on the wheel support member and has the axis parallel to the axial direction of the ring frame; a swinging axle having a proximal end swingingly supported around the support shaft and a distal end that rotatably supports the wheel; a pinion gear fixed to the swinging axle; a swinging plate that is swingingly supported around the support shaft and has tooth spaces in engagement with the pinion gear; and stoppers that regulate the swinging range of the swinging axle and the swinging plate within a predetermined angle range.

As an aspect of the present invention, in order to solve the problem such that a change from a side-lying state to an upright state is made only with a pair of wheels, the wheel displacement mechanism may include: a support shaft that is provided on the wheel support member and has the axis parallel to the axial direction of the ring frame; a pair of swing arms, each having a proximal end swingingly supported around the support shaft and a distal end that rotatably supports the wheel; stoppers that regulate the swinging range of the swing arm within a predetermined angle range; an inner connecting wire connecting the inner sides of the swing arms; an outer connecting wire connecting the outer sides of the swing arms; a fall sensor for detecting a change of the four-legged animal from an upright state to a side-lying state; and a wire drive mechanism that reduces the tension of the inner connecting wire and pulls both ends of the outer connecting wire when the fall sensor detects the side-lying state of the four-legged animal.

As an aspect of the present invention, in order to solve the problem such that the tension of the inner connecting wire is reduced and both ends of the outer connecting wire are pulled with a simple configuration, the wire drive mechanism may include two fixed pulleys spaced at a predetermined distance, a pair of traveling pulleys provided to reciprocate relative to the respective fixed pulleys, and drive motors for reciprocating the traveling pulleys, the inner connecting wire is wound around the first traveling pulley of the pair of traveling pulleys and the first fixed pulley, both ends of the inner connecting wire are connected to the inner side of the swing arm, the outer connecting wire is wound around the second traveling pulley and the second fixed pulley, and both ends of the outer connecting wire are connected to the outer side of the swing arm while being wound around the ring frame.

Furthermore, as an aspect of the present invention, in order to solve the problem such that when the four-legged animal walks to curve to the left or right, the four-legged animal can be prevented from falling due to the outward swinging of the forelimbs or hindlimbs, the four-legged animal wheelchair may further include a lock mechanism for locking each of the wheel support members at a predetermined position on the ring frame when the four-legged animal stands up in an upright state, the lock mechanism unlocking the wheel support members while the wire drive mechanism swings the swing arms.

As an aspect of the present invention, in order to solve the problem such that even when the holder or the saddle near the normal limbs and the ring frames near the impaired limbs are connected to each other, the four-legged animal in the side-lying state easily moves the normal limbs and stands up by itself, the four-legged animal wheelchair may further include a holder or a saddle that is attached to the body of the four-legged animal near normal limbs, a connecting frame connecting the holder or the saddle and the ring frame, and a fall sensor for detecting a change of the four-legged animal from an upright state to a side-lying state, wherein the connecting frame may be configured to elastically deform around rotating shafts in the lateral direction, the vertical direction, and the longitudinal direction with respect to the four-legged animal, and the connecting frame may include an elastic-force adjusting mechanism for reducing the elastic force of the connecting frame when the fall sensor detects the side-lying state of the four-legged animal.

Advantageous Effect of Invention

The present invention enables a four-legged animal that falls or the like and is placed into a side-lying state to stand up by itself.

BRIEF DESCRIPTION OF DRAWINGS

FIG. 1 illustrates a four-legged animal that wears a first embodiment of a four-legged animal wheelchair according to the present invention.

FIG. 2 is an exploded view of the four-legged animal wheelchair according to the first embodiment.

FIG. 3 illustrates a connecting frame according to the first embodiment.

FIGS. 4(a) to 4(c) are overall views and enlarged views illustrating the states of wheels in (a) an upright state, (b) a side-lying state, and (c) return to an upright state from a side-lying state in the four-legged animal wheelchair according to the first embodiment.

FIG. 5 illustrates a four-legged animal that wears a second embodiment of the four-legged animal wheelchair according to the present invention.

FIG. 6 is an exploded view of the four-legged animal wheelchair according to the second embodiment.

FIG. 7 illustrates a wire drive mechanism according to the second embodiment.

FIGS. 8(a) and 8(b) are (a) a front view and (b) a side view of a lock mechanism according to the second embodiment.

FIGS. 9(a) to 9(f) illustrate the states of wheels when the four-legged animal wheelchair according to the second embodiment changes from an upright state to a side-lying state and returns to the upright state.

FIG. 10 illustrates a four-legged animal that wears a third embodiment of the four-legged animal wheelchair according to the present invention.

FIG. 11 illustrates a modification example of the four-legged animal wheelchair according to the first embodiment.

FIG. 12 illustrates a modification example of the four-legged animal wheelchair according to the second embodiment.

DESCRIPTION OF EMBODIMENTS

A first embodiment of a four-legged animal wheelchair according to the present invention will be described below in accordance with the accompanying drawings.

A four-legged animal wheelchair 1A of the first embodiment is used for a four-legged animal that suffers walking difficulty because its hindlimbs are paralyzed or amputated or the like due to sickness or an accident and have insufficient motor function. In the first embodiment, the four-legged animal is a dog but is not limited thereto. The present invention is applicable to all animals walking with four legs. In the following description, indicated directions are shown by using the longitudinal direction, the lateral direction, and the vertical direction of a four-legged animal.

As illustrated in FIGS. 1 and 2, the four-legged animal wheelchair 1A of the first embodiment mainly includes a ring frame 2 attached to a body near impaired limbs, three wheel support members 3 slidably provided along the outer circumference of the ring frame 2, wheel displacement mechanisms 5 for displacing the wheels 4 to positions in an upright state, a holder 6 attached to the front body part of a four-legged animal, and a connecting frame 7 connecting the holder 6 and the ring frame 2. The configurations will be described below.

The ring frame 2 is attached to the body of a four-legged animal near impaired limbs. For example, as illustrated in FIG. 1, if hindlimbs are impaired, the ring frame 2 is attached to the body near the hindlimbs. In the first embodiment, the ring frame 2 is ring-shaped and has grooves 21 on the front end face and the rear end face along the circumferential direction as illustrated in FIG. 2. The grooves 21 catching claws 31 of the wheel support members 3, which will be described later, rotatably hold the wheel support members 3 along the outer circumference of the ring frame 2.

In the first embodiment, the ring frame 2 is divided into upper and lower parts as illustrated in FIG. 2. The upper and lower parts are configured to be connected via connecting fittings 22. Thus, the ring frame 2 can be easily attached and removed to and from the four-legged animal. Furthermore, a cushioning material (not illustrated) for reducing an impact to the body surface of the four-legged animal is attached to the inner surface of the ring frame 2. Moreover, a saddle 8 for holding the body near the impaired limbs is connected to the lower end of the ring frame 2. On the left and right of the saddle 8, impaired-limb covers 9 for holding impaired limbs are removably provided. The impaired-limb covers 9 are made of a flexible material and have an auxiliary wheel 91 at the lower ends.

The wheel support members 3 are slidably provided along the outer circumference of the ring frame 2 and rotatably support the wheels 4. In the first embodiment, the wheel support members 3 each have a circumferential length that is determined by trisecting the circumference of the ring frame 2 as illustrated in FIG. 2. The claws 31 protruded inward are provided on the circumferential ends of the wheel support members 3. The wheel support members 3 are attached by inserting the claws 31 of the wheel support members 3 into the grooves 21 of the divided ring frames 2 and connecting the ring frames 2.

In the first embodiment, the positional relationship of the three wheel support members 3 in the circumferential direction of the ring frames 2 is fixed by providing them so as to be in contact with one another. The configuration of the wheel support members 3 are not limited thereto and may be changed when necessary. For example, the number of wheel support members 3 may be four or more. The positional relationship among the wheel support members 3 may be fixed by connecting the wheel support members 3 with a link frame or the like.

The wheel displacement mechanism 5 displaces a plurality of the wheels 4 to positions in an upright state when the four-legged animal changes from an upright state to a side-lying state. According to the first embodiment, as illustrated in FIGS. 1 and 2, the wheel displacement mechanism 5 is provided for each of the three wheel support members 3. The wheel displacement mechanism 5 includes a support shaft 51 that is provided on the wheel support member 3 and has the axis parallel to the axial direction of the ring frame 2, a swinging axle 52 having a proximal end swingingly supported around the support shaft 51 and a distal end that rotatably supports the wheel 4, a pinion gear 53 fixed to the swinging axle 52, a swinging plate 54 that is swingingly supported around the support shaft 51 and has tooth spaces in engagement with the pinion gear 53, and stoppers 55 that regulate the swinging range of the swinging axle 52 and the swinging plate 54 within a predetermined angle range.

In the first embodiment, the stoppers 55 are provided such that the swinging axle 52 and the swinging plate 54 have a swinging range of about 60°. The stoppers 55 are not limited to this configuration. In other words, for a four-legged animal in an upright state, it is only necessary to regulate any two of the swinging axles 52 in a linear form substantially along the horizontal direction. The swinging plate 54 is substantially fan-shaped. The shape is not limited thereto.

The swinging range satisfies a follow formula:

$$AR = 180 \text{ degrees}/N$$

where, AR means (angle range) and N means the number of wheels 4. N may mean the number of the swinging axle 52.

The holder 6 is attached to the front body (chest) of the four-legged animal and is made of a flexible material. In the first embodiment, the holder 6 is divided into the upper and lower parts as illustrated in FIG. 2. The upper and lower parts can be connected with a hook-and-loop fastener or the like.

The connecting frame 7 connects the holder 6 and the ring frame 2. In the first embodiment, as illustrated in FIGS. 1 and 2, the connecting frame 7 has the front end connected to the upper end of the holder 6 and the rear end connected to the upper end of the ring frame 2. The connecting frame 7 is configured to elastically deform around rotating shafts in the lateral direction, the vertical direction, and the longitudinal direction with respect to the four-legged animal.

Specifically, as illustrated in FIG. 3, the connecting frame 7 includes a front member 71 swinging around a lateral rotating shaft 70a, an intermediate member 72 swinging around a vertical rotating shaft 70b, and a rear member 73 rotating around a longitudinal rotating shaft 70c that are connected to one another. Moreover, coil springs 74 are provided to apply, in response to a swing or a rotation from a normal upright state, an elastic force in a direction that enables recovery to the normal state. The coil springs 74 are each configured to adjust an elastic force with a screw or the like.

Furthermore, in the first embodiment, a fall sensor 14 for detecting a change of the four-legged animal from an upright state to a side-lying state is located without interfering with the ring frames 2 or the like. Additionally, an elastic-force adjusting mechanism 75 is provided to reduce the elastic force of the connecting frame 7 when the fall sensor detects the side-lying state of the four-legged animal.

Specifically, as illustrated in FIG. 3, the elastic-force adjusting mechanism 75 is configured such that the tension of an adjusting wire 76 hung on the rear member 73 is adjusted by the forward and backward rotations of a tension adjusting motor 77. In a normal upright state, the tension of the adjusting wire 76 is increased to pull the rear member 73 backward and is brought into contact with a fixing member 78, thereby increasing the elastic force of the connecting frame 7.

When the fall sensor detects the side-lying state of the four-legged animal, the rear member 73 is released from the fixing member 78 by reducing the tension of the adjusting wire 76. This reduces the elastic force of the connecting frame 7. Thus, even when the holder 6 near the normal limbs and the ring frames 2 near the impaired limbs are connected to each other, the four-legged animal in the side-lying state easily moves the normal limbs and stands up by itself. The fall sensor may be properly selected from mechanisms including a tilt sensor and a gyro sensor that can detect a change of the four-legged animal from an upright state to a side-lying state.

The operations of the four-legged animal wheelchair 1A of the first embodiment will be described below in accordance with the accompanying drawings.

As illustrated in FIG. 4(a), the four-legged animal wheelchair 1A attached to a four-legged animal according to the first embodiment has wheels 4a and 4b laterally placed at the bottom in contact with the ground in a normal upright state, so that the swinging axles 52 of the wheels 4 come into contact with the upper stoppers 55 and are regulated in a linear form substantially along the horizontal direction. Thus, the left and right wheels 4a and 4b are rotatably supported at normal positions as substitutes for impaired limbs, enabling smooth walking only with normal limbs.

In the upright state, the swinging plate 54 is brought into contact with the lower stopper 55 by its own weight. Since an upper wheel 4c is placed in a free state, the upper wheel 4c may be directed upward as illustrated in FIG. 4(a) or may be tilted in contact with one of the left and right stoppers 55.

When the four-legged animal falls or the like and is placed into a side-lying state, as illustrated in FIG. 4(b), the wheel 4b, one of the wheels in contact with the ground, and the upper wheel 4c separated from the ground are brought into contact with the ground. Furthermore, the swinging plate 54 is brought into contact with the pinion gear 53 that is on the lower side by its own weight. In the side-lying state, the belly of the four-legged animal is directed upward once. In the first embodiment, the ring frames 2 and the wheel support members 3 are configured to rotate relative to each other.

Thus, by twisting the front body to an upright state using the normal forelimbs, the ring frames 2 attached to the rear body are smoothly rotated relative to the wheel support members 3 whose rotations are regulated by the wheels 4b and 4c that are in contact with the ground. This allows the rear body to follow the twisting motion of the front body, so that the four-legged animal stands up by itself in a normal upright state.

At this point, in the first embodiment, when the fall sensor detects the side-lying state of the four-legged animal, the elastic-force adjusting mechanism 75 reduces the elastic force of the connecting frame 7. Thus, even when the ring frames 2 are connected to the holder 6 attached near the normal limbs, the normal limbs easily move in the side-lying state, allowing the four-legged animal to easily stand up by itself.

Subsequently, even when the four-legged animal stands up in an upright state as described above, the left and right wheels 4b and 4c may remain diagonal to the ground as illustrated in FIG. 4(b). In the first embodiment, however, when the four-legged animal having returned to the upright state starts walking forward by using its normal limbs, the wheel displacement mechanisms 5 displace the wheels 4b and 4c to positions in the upright state.

Specifically, when the four-legged animal starts walking forward by using its normal limbs, the tilted wheels 4b and 4c are dragged to rotate. When the pinion gear 53 fixed to each of the swinging axles 52 rotates in response to the rotation, as illustrated in FIG. 4(c), the swinging plate 54 is moved downward while the pinion gear 53 is engaged with the tooth spaces of the swinging plate 54 that is brought into contact with the pinion gear 53 on the lower side by its own weight. When the swinging plate 54 comes into contact with the lower stopper 55 and is fixed thereto, the pinion gear 53 moves upward while engaging with the tooth spaces of the swinging plate 54. This allows the swinging axles 52 to gradually move upward and the contact points with the ground of the wheels 4b and 4c to gradually move outward.

When the contact points move to the outside of the support shafts 51, the weight of the four-legged animal and the weight of the four-legged animal wheelchair 1A on the support shafts 51 are combined to swing the swinging axles 52 into contact with the upper stoppers 55. Thus, the swinging axles 52 of the wheels 4b and 4c are placed in a linear form substantially along the horizontal direction and return to positions in the normal upright state. At this point, the swinging plate 54 engaged with the pinion gear 53 is dragged upward with the swinging axle 52. Upon disengagement, the swinging plate 54 is swung toward the ground by its own weight.

The first embodiment of the four-legged animal wheelchair 1A according to the present invention as described above achieves the following effects:

1. A four-legged animal that falls or the like and is placed into a side-lying state can stand up by itself.
2. The wheels 4 can be displaced only with machine components without using a sensor or a motor or the like.
3. Even when the holder 6 near the normal limbs and the ring frames 2 near the impaired limbs are connected to each other, the four-legged animal in the side-lying state easily moves the normal limbs and stands up by itself.
4. By shortening a distance between the ring frames 2 and the wheels 4, design is improved and collisions or the like can be prevented, and it is suitable for a four-legged animal having short legs with a low center of gravity, for example, a dachshund.

A second embodiment of the four-legged animal wheelchair according to the present invention will be described below. Among the configurations of the second embodiment, the configurations identical or equivalent to those of the first embodiment described above are indicated by the same reference numerals, and a redundant explanation thereof is omitted.

A four-legged animal wheelchair 1B according to the second embodiment features wheel displacement mechanisms 5 that are also suitable for a four-legged animal having long legs with a high center of gravity.

Specifically, as illustrated in FIG. 5, the four-legged animal wheelchair 1B of the second embodiment is configured for hindlimbs as in the first embodiment and includes two wheel support members 3, 3 slidable along the outer circumference of ring frames 2. Between the wheel support members 3, a drive box 10 and a power-supply box 11 are slidably provided along the outer circumference of the ring frames 2. The drive box 10 contains a wire drive mechanism, which will be described later, and the power-supply box 11 supplies power to the drive box 10.

In the second embodiment, the wheel displacement mechanism 5 is provided for each of the two wheel support members 3. Specifically, as illustrated in FIG. 6, the wheel displacement mechanism 5 includes a support shaft 51 that is provided in the wheel support member 3 and has the axis parallel to the axial direction of the ring frame 2, a pair of swing arms 56, 56 each having a proximal end swingingly supported around the support shaft 51 and a distal end that rotatably supports a wheel 4, stoppers 55 that regulate the swinging range of the swing arm 56 within a predetermined angle range, an inner connecting wire 57 connecting the inner sides of the swing arms 56, an outer connecting wire 58 connecting the outer sides of the swing arms 56, a fall sensor 14 for detecting a change of the four-legged animal from an upright state to a side-lying state, and a wire drive mechanism 59 that reduces the tension of the inner connecting wire 57 and pulls both ends of the outer connecting wire 58 when the fall sensor detects the side-lying state of the four-legged animal.

In the second embodiment, as illustrated in FIG. 7, the wire drive mechanism 59 is provided in the drive box 10 and includes two fixed pulleys 61, 61 spaced at a predetermined distance, a pair of traveling pulleys 62, 62 provided to reciprocate relative to the respective fixed pulleys 61, drive motors 63 for reciprocating the traveling pulleys 62, motor arms 64 fixed to the drive shafts of the drive motors 63, respectively, and traction belts 65 each of which connect the motor arm 64 and the traveling pulley 62.

As illustrated in FIG. 6, the inner connecting wire 57 is wound around the first traveling pulley 62 of the pair of traveling pulleys 62, 62 and the first fixed pulley 61, and both ends of the inner connecting wire 57 are connected to the inner side of the swing arm 56. The outer connecting wire 58 is wound around the second traveling pulley 62 and the second fixed pulley 61, and both ends of the outer connecting wire 58 are connected to the outer side of the swing arm 56 while being wound around the ring frame 2.

With this configuration, each time the fall sensor detects the side-lying state of the four-legged animal, one of the drive motors 63 is placed into an idle state to reduce the tension of the inner connecting wire 57; meanwhile, the other drive motor 63 winds up the traction belt 65 by using the motor arm 64 and pulls both ends of the outer connecting wire 58, thereby displacing the swing arms 56.

In the second embodiment, the inner side and the outer side indicates an inner side and an outer side relative to the pair of swing arms 56, 56 in a normal upright state. As will be described later, the positional relationship between the swing arms 56 is laterally reversed each time the four-legged animal falls, so that the relationship between the inner side and the outer side is also reversed.

Although the second embodiment is suitable for a four-legged animal having long legs with a high center of gravity, the four-legged animal walking to curve to the left or right is likely to fall because the forelimbs or hindlimbs swing outward. Thus, in the second embodiment, a lock mechanism 80 is provided to lock each of the wheel support members 3 at a predetermined position on the ring frame 2 when the four-legged animal stands up in an upright state. The lock mechanism 80 unlocks the wheel support members 3 while the wire drive mechanism 59 swings the swing arms 56.

Specifically, as illustrated in FIGS. 8(a) and 8(b), the lock mechanism 80 includes a pair of through holes 81, 81 located at the base part of the wheel support member 3 with point symmetry with respect to the center of the support shaft 51, a pair of spring lock pins 82, 82 located on the inner surface and the outer surface of the swing arm 56 so as to pass through the through holes 81, and a locking hole 83 provided at a predetermined position on the outer surface of the ring frame 2, the spring lock pins 82 being insertable into and removable from the locking hole 83.

The operations of the four-legged animal wheelchair 1B of the second embodiment will be described below in accordance with the accompanying drawings. In FIGS. 9(a) to 9(f), the inner connecting wire 57 and the outer connecting wire 58 are omitted.

In the four-legged animal wheelchair 1B attached to the four-legged animal according to the second embodiment, one of the drive motors 63 winds up the traction belt 65 by using the motor arm 64 and holds the first traveling pulley 62 separated from the first fixed pulley 61 in a normal upright state. Thus, as illustrated in FIG. 9(a), the swing arms 56 are pulled close to each other by the inner connecting wire 57 and are held in contact with the stoppers 55.

At this point, in the second embodiment, the spring lock pin 82 provided on the inner side of the swing arm 56 is inserted into the locking hole 83 of the ring frame 2 while passing through the through hole 81 of the wheel support member 3. Thus, the sliding movements of the wheel support members 3 are regulated with respect to the ring frames 2, so that the wheel support members 3 are locked in a normal upright state. Hence, even when the four-legged animal walks to curve to the left or right, the forelimbs or hindlimbs hardly swing outward. This prevents the four-legged animal having long legs with a high center of gravity from falling with the wheelchair. Moreover, the spring lock pin 82 is not excessively pressed to the ring frame 2 by a spring elastic force.

Subsequently, when the fall sensor detects the side-lying state of the four-legged animal, one of the drive motors 63 is placed into an idle state; meanwhile, the other drive motor 63 winds up the traction belt 65 by using the motor arm 64 and pulls the second traveling pulley 62 in a direction that separates from the second fixed pulley 61. When the second traveling pulley 62 reaches the remotest position, the other drive motor 63 stops.

Thus, at first, as illustrated in FIG. 9(b), a movement of the swing arm 56 on the ground side is first regulated by the weight of the four-legged animal, and only the swing arm 56 not in contact with the ground is pulled outward to swing by the outer connecting wire 58. At this point, the spring lock pin 82 of the swung swing arm 56 is pulled out of the locking hole 83 of the ring frame 2 and the through hole 81 of the wheel support member 3, thereby unlocking the wheel support member 3.

Thereafter, as illustrated in FIG. 9(c), when the swing arm 56 coming into contact with the stopper 55 on the opposite side, it is pulled together with the wheel support member 3, or both of the swing arm 56 and the wheel support member 3 are pulled by the outer connecting wire 58 and are rotated clockwise along the ring frame 2. As illustrated in FIG. 9(d), when the wheel 4 of the moved swing arm 56 comes into contact with the ground and a load is applied to the wheel 4, the swing arms 56 are both pulled in a direction that brings the swing arms 56 close to each other. With this configuration, the spring lock pin 82 of the swing arm 56 on the ground side is pulled out of the locking hole 83 of the ring frame 2 and the through hole 81 of the wheel support member 3, thereby unlocking the wheel support member 3.

Thus, by twisting the front body to an upright state using the normal forelimbs, the ring frames 2 attached to the rear body are smoothly rotated relative to the wheel support members 3 that are pulled inward by the inner connecting wire 57. This allows the rear body to follow the twisting motion of the front body, so that the four-legged animal stands up in a normal upright state.

At this point, in the second embodiment, when the fall sensor detects the side-lying state of the four-legged animal as in the first embodiment, an elastic-force adjusting mechanism 75 reduces the elastic force of a connecting frame 7. Thus, even when the ring frames 2 are connected to the holder 6 attached near the normal limbs, the normal limbs easily move in the side-lying state, allowing the four-legged animal to easily stand up by itself.

Thereafter, as illustrated in FIG. 9(e), the rear body of the four-legged animal is gradually lifted together with the ring frames 2. At this point, as illustrated in FIG. 9(f), the swing arms 56 are held in contact with the stoppers 55. With this configuration, the wheels 4 of the swing arms 56 return to the positions in the normal upright state, and the four-legged animal stands up in a normal upright state by itself.

At this point, the spring lock pin 82 provided on the inner side (the outer side before swinging) of the swing arm 56 is inserted into the locking hole 83 of the ring frame 2 while passing through the through hole 81 of the wheel support member 3. Thus, the sliding movements of the wheel support members 3 are regulated with respect to the ring frames 2, so that the wheel support members 3 are locked in a normal upright state.

In the displacing motions of the wheels 4 described above according to the second embodiment, a first-half process (FIGS. 9(b) to 9(d)), in which a large torque is not necessary for the traction of the swing arms 56, causes the drive motors 63 to wind up the traction belts 65 by using the motor arms 64, thereby quickly swinging and moving the swing arms 56. A second-half process (FIGS. 9(d) to 9(f)), in which a large torque is necessary for the traction of the swing arms 56, causes the drive motors 63 to wind up the traction belts 65 by using the proximal ends of the motor arms 64, thereby slowly swinging the swing arms 56 with a high torque. In this way, the winding speed and torque of the traction belt 65 are properly adjusted according to the steps of the displacing motions of the wheels 4.

The second embodiment of the four-legged animal wheelchair as described above according to the present invention achieves, in addition to the effects of the first embodiment, the following effects:

1. A displacement from the side-lying state to the upright state can be implemented only by the pair of wheels 4, 4.
2. The tension of the inner connecting wire 57 can be reduced and both ends of the outer connecting wire 58 can be pulled with a simple configuration.
3. When the four-legged animal walks to curve to the left or right, the four-legged animal can be prevented from falling due to the outward swinging of the forelimbs or hindlimbs.
4. Since a distance between the ring frames 2 and the wheels 4 can be extended, it is suitable for a four-legged animal having long legs with a high center of gravity, for example, a hound dog.

A third embodiment of the four-legged animal wheelchair according to the present invention will be described below. Among the configurations of the third embodiment, the configurations identical or equivalent to those of the foregoing embodiments are indicated by the same reference numerals, and a redundant explanation thereof is omitted.

The first and second embodiments described the four-legged animal wheelchairs 1A and 1B for hindlimbs. A feature of a four-legged animal wheelchair 1C of the third embodiment is that the four-legged animal wheelchair 1B of the second embodiment is configured for forelimbs.

Specifically, as illustrated in FIG. 10, ring frames 2 are provided on the rear end of a holder 6 attached to the front body of a four-legged animal. The ring frames 2 and a saddle 8 attached to the rear body of the four-legged animal are connected to each other via a connecting frame 7.

With this configuration, even when a four-legged animal falls or the like and is placed into a side-lying state, the same motions as those of the second embodiment are made near the forelimbs, enabling the four-legged animal to stand up by itself.

The four-legged animal wheelchair according to the present invention is not limited to the foregoing embodiments and can be properly changed.

For example, in the foregoing embodiments, the ring frames 2 are separably configured to facilitate the attachment and detachment of the four-legged animal wheelchair to and from the four-legged animal. The ring frames 2 may not be separable if the four-legged animal can easily wear and remove the wheelchair. Likewise, an inner connecting wire 57 and an outer connecting wire 58 are separably configured but may not be separable.

In the foregoing embodiments, the holder 6 and the saddle 8 are attached near normal limbs and are connected to the ring frames 2 by using the connecting frame 7. The present invention is not limited to this configuration. In other words, the ring frames 2 firmly attachable near impaired limbs eliminate the need for providing the holder 6, the saddle 8, and the connecting frame 7.

In the first embodiment, the saddle 8 is provided to hold the rear body, which is a body near impaired limbs. The present invention is not limited to this configuration. The configuration can be omitted depending upon the body shape of the four-legged animal. Specifically, as illustrated in FIG. 11, the rear body of the four-legged animal may be covered with an integral cover 12 that is a combination of a cushioning material and the impaired-limb covers 9, and the ring frames 2 may be fixed to the outer surface of the integral cover 12.

In the foregoing embodiments, the rod-like connecting frame 7 connects the holder 6 or the saddle 8 and the ring frames 2. The present invention is not limited to this configuration. In other words, if elastic deformation can be made around rotating shafts in the lateral direction, the vertical direction, and the longitudinal direction with respect to the four-legged animal, the connection may be made via a spring member, e.g., a plate spring or a mesh-type net material 13 made of a flexible material as illustrated in FIG. 12.

REFERENCE SIGNS LIST 1A, 1B, 1C Four-legged animal wheelchair
2 Ring frame
3 Wheel support member
4 Wheel
5 Wheel displacement mechanism
6 Holder
7 Connecting frame
8 Saddle
9 Impaired limb cover
14 Fall Sensor
31 Claw
51 Support shaft
52 Swinging axle
53 Pinion gear
54 Swinging plate
55 Stopper
56 Swing arm
57 Inner connecting wire
58 Outer connecting wire
59 Wire drive mechanism
70a, 70b, 70c Rotating shaft
71 Front member
72 Intermediate member
73 Rear member
74 Coil spring
75 Elastic-force adjusting mechanism
76 Adjusting wire
77 Tension adjusting motor
78 Fixing member

The invention claimed is:

1. A four-legged animal wheelchair used for a four-legged animal, comprising:
a ring frame attached to a body of the four-legged animal near impaired limbs;
a plurality of wheel support members that are slidably provided along an outer circumference of the ring frame and rotatably support wheels; and
wheel displacement mechanisms for displacing, when the four-legged animal changes from an upright state to a side-lying state, a plurality of the wheels to positions in the upright state.

2. The four-legged animal wheelchair according to claim 1, wherein
the wheel displacement mechanism includes:
a support shaft that is provided on the wheel support member and has an axis parallel to an axial direction of the ring frame;
a swinging axle having a proximal end swingingly supported around the support shaft and a distal end that rotatably supports the wheel;
a pinion gear fixed to the swinging axle;
a swinging plate that is swingingly supported around the support shaft and has tooth spaces in engagement with the pinion gear; and
stoppers that regulate a swinging range of the swinging axle and the swinging plate within a predetermined angle range.

3. The four-legged animal wheelchair according to claim 2, wherein
the predetermined angle range of the stopper satisfies a follow formula:

$$AR = 180 \text{ degrees}/N$$

where
AR: angle range
N: the number of wheels.

4. The four-legged animal wheelchair according to claim 1, wherein
the wheel displacement mechanism includes:
a support shaft that is provided on the wheel support member and has an axis parallel to an axial direction of the ring frame;
a pair of swing arms, each having a proximal end swingingly supported around the support shaft and a distal end that rotatably supports the wheel;
stoppers that regulate a swinging range of the swing arm within a predetermined angle range;

an inner connecting wire connecting inner sides of the swing arms;

an outer connecting wire connecting outer sides of the swing arms;

a fall sensor for detecting a change of the four-legged animal from an upright state to a side-lying state; and a wire drive mechanism that reduces a tension of the inner connecting wire and pulls both ends of the outer connecting wire when the fall sensor detects the side-lying state of the four-legged animal.

5. The four-legged animal wheelchair according to claim 4, wherein the wire drive mechanism includes two fixed pulleys spaced at a predetermined distance, a pair of traveling pulleys provided to reciprocate relative to the respective fixed pulleys, and drive motors for reciprocating the traveling pulleys, and the inner connecting wire is wound around the first traveling pulley of the pair of traveling pulleys and the first fixed pulley, both ends of the inner connecting wire are connected to an inner side of the swing arm, the outer connecting wire is wound around the second traveling pulley and the second fixed pulley, and both ends of the outer connecting wire are connected to an outer side of the swing arm while being wound around the ring frame.

6. The four-legged animal wheelchair according to claim 5, further comprising:

a lock mechanism for locking each of the wheel support members at a predetermined position on the ring frame when the four-legged animal stands up in an upright state, the lock mechanism unlocking the wheel support members while the wire drive mechanism swings the swing arms.

7. The four-legged animal wheelchair according to claim 4, further comprising:

a lock mechanism for locking each of the wheel support members at a predetermined position on the ring frame when the four-legged animal stands up in an upright state, the lock mechanism unlocking the wheel support members while the wire drive mechanism swings the swing arms.

8. The four-legged animal wheelchair according to claim 1, further comprising:

a holder or a saddle that is attached to the body of the four-legged animal near normal limbs, a connecting frame connecting the holder or the saddle and the ring frame, and a fall sensor for detecting a change of the four-legged animal from an upright state to a side-lying state, wherein the connecting frame is configured to elastically deform around rotating shafts in a lateral direction, a vertical direction, and a longitudinal direction with respect to the four-legged animal, and the connecting frame includes an elastic-force adjusting mechanism for reducing an elastic force of the connecting frame when the fall sensor detects the side-lying state of the four-legged animal.

* * * * *